(12) United States Patent
Brown

(10) Patent No.: US 11,086,987 B2
(45) Date of Patent: Aug. 10, 2021

(54) MALWARE DETECTION IN EVENT LOOPS

(71) Applicant: CrowdStrike, Inc., Irvine, CA (US)

(72) Inventor: Daniel W. Brown, Beverly, MA (US)

(73) Assignee: CrowdStrike, Inc., Irvine, CA (US)

( * ) Notice: Subject to any disclaimer, the term of this patent is extended or adjusted under 35 U.S.C. 154(b) by 148 days.

(21) Appl. No.: 15/857,896

(22) Filed: Dec. 29, 2017

(65) Prior Publication Data

US 2019/0205530 A1    Jul. 4, 2019

(51) Int. Cl.
*G06F 21/55* (2013.01)
*G06F 21/56* (2013.01)
*G06F 21/53* (2013.01)

(52) U.S. Cl.
CPC ............ *G06F 21/552* (2013.01); *G06F 21/53* (2013.01); *G06F 21/566* (2013.01); *G06F 2221/034* (2013.01)

(58) Field of Classification Search
CPC .. G06F 21/53; G06F 21/552; G06F 2221/034; G06F 21/566; G06F 21/57; G06N 5/04; G06N 7/005; H04L 41/069; H04L 41/0604; H04L 43/16; H04L 43/04; H04L 43/067; H04L 63/1425
See application file for complete search history.

(56) References Cited

U.S. PATENT DOCUMENTS

| | | | |
|---|---|---|---|
| 6,973,577 B1 * | 12/2005 | Kouznetsov | G06F 21/566 |
| | | | 707/999.009 |
| 7,272,748 B1 * | 9/2007 | Conover | G06F 11/1407 |
| | | | 712/233 |
| 9,256,517 B1 * | 2/2016 | MacPherson | G06F 9/4486 |
| 2010/0132038 A1 | 5/2010 | Zaitsev | |
| 2015/0242628 A1 * | 8/2015 | Burt | H04L 63/1441 |
| | | | 726/23 |
| 2016/0232347 A1 * | 8/2016 | Badishi | G06F 21/54 |
| 2017/0116418 A1 | 4/2017 | Shanmugavelayutham et al. | |
| 2017/0163669 A1 * | 6/2017 | Brown | H04L 63/1425 |
| 2018/0349603 A1 * | 12/2018 | Yamada | G06F 21/554 |
| 2019/0207969 A1 | 7/2019 | Brown | |

OTHER PUBLICATIONS

"Cuckoo Sandbox Book", Cuckoo Sandbox, Release 2.0.0, Apr. 18, 2017, pp. 1, 7, 8, 13-16, 27-30, 53, 57, 58, 92-95, 104-112.

(Continued)

*Primary Examiner* — Kevin Bechtel
*Assistant Examiner* — Sangseok Park
(74) *Attorney, Agent, or Firm* — Lee & Hayes, P.C.

(57) ABSTRACT

Example techniques locate or identify malware based on events from or at monitored computing devices. A control unit can detect a sequence of events of various types. The control unit can locate a loop within the sequence of events based at least in part on relative frequencies of the event types. The control unit can determine a distribution of event types of the events within the loop, and determining that software running the sequence is associated with malware based at least in part on the distribution of event types within the loop. In some examples, the control unit can locate a point of commonality among a plurality of stack traces associated with respective events within the loop. The control unit can determine a malware module comprising the point of commonality.

20 Claims, 11 Drawing Sheets

(56) References Cited

OTHER PUBLICATIONS

"Kernel-Mode Driver Architecture Design Guide," Jun. 19, 2017, retrieved Sep. 22, 2017 from <<https://opbuidstorageprod.blob.core.windows.net/output-pdf-filed/en-us/Win.wdkdocs/live/kernel.pdf>>.

Poppe, et al., "Complete Event Trend Detection in High-Rate Event Streams", SIGMOD, May 14-19, 2017, 16 pages.

Russinovich, M., "Process Monitor", V3.40, Sep. 12, 2017, 4 pages.

Chandola et al, "Anomaly Detection for Discrete Sequences: A Survey", retrieved at <<http://ieeexplore.ieee.org/xpls/abs_all.jsp?arnumber=5645624>>, IEEE Transactions on Knowledge and Data Engineering, Jan. 1, 2012, pp. 823-839.

Extended European Search Report from the European Patent Office for Application No. 19159081.9, dated Jul. 5, 2019, a counterpart foreign application of U.S. Appl. No. 15/857,896, 7 pages.

Warrender et al, "Detecting Intrusion using System Calls: Alternative Data Models", Security and Privacy, Proceedings of the 1999 IEEE Symposium on Oakland, CA, Jan. 1, 1999, pp. 133-145.

The Extended European Search Report dated Apr. 12, 2019, for European Patent Application No. 18206503.7, 7 pages.

\* cited by examiner

MALWARE DETECTION IN EVENT LOOPS

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is described with reference to the accompanying figures, in which the use of the same reference numbers in different figures indicates similar or identical items or features. For brevity of illustration, an arrow beginning with a diamond connects a first component or operation (at the diamond end) to at least one second component or operation that is or can be included in the first component or operation in at least one example.

DETAILED DESCRIPTION

Overview

Figure 1:
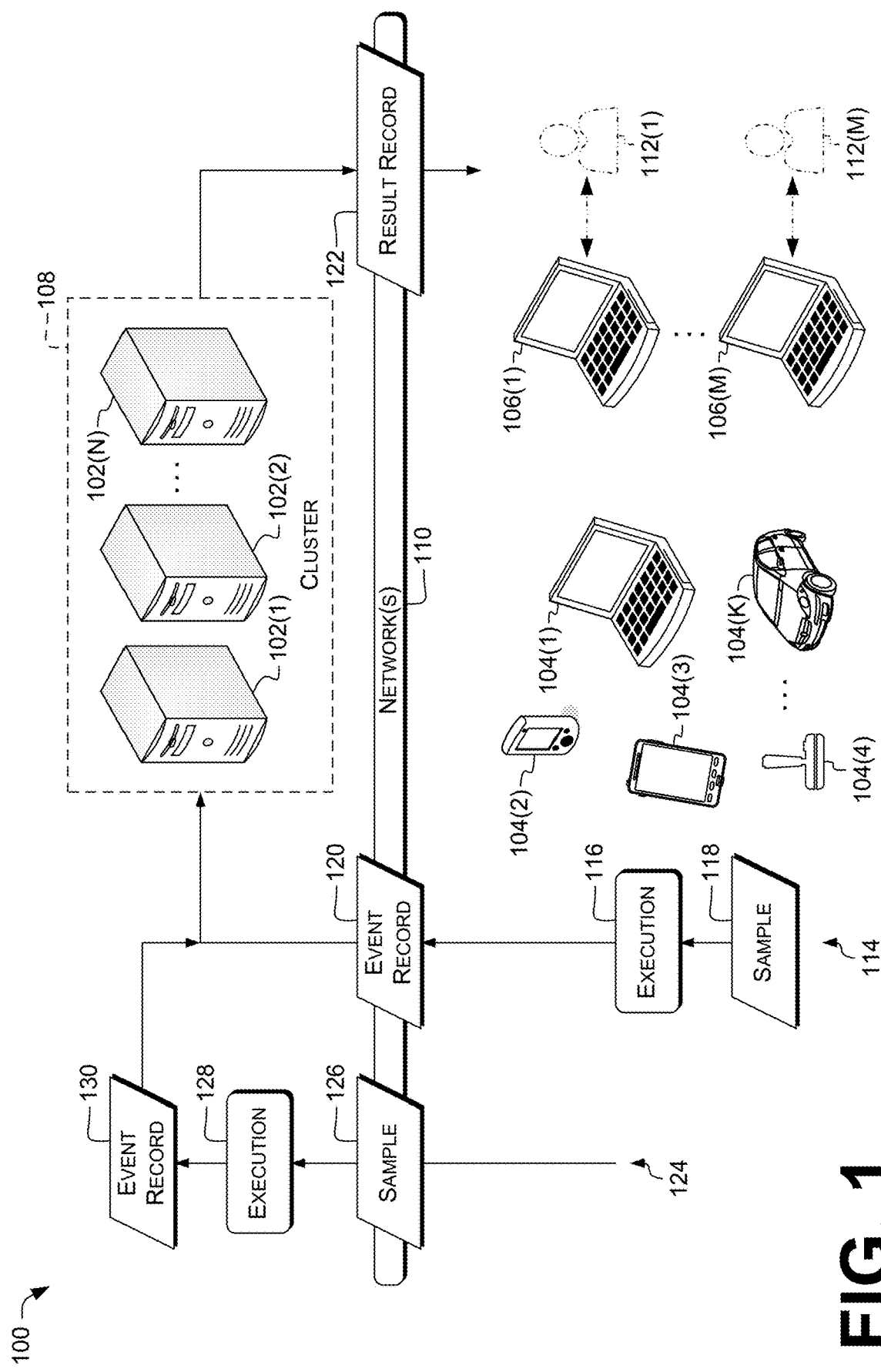
FIG. 1 is a block diagram depicting example scenarios for detecting malware and for collecting, processing, and reporting event data.

Some examples herein relate to detecting malware or malicious behavior, e.g., by recording events performed by programs and analyzing distributions of types of those events. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware.

For clarity, processes running on a computing system are referred to herein as "procs" to distinguish them from process 400 and other sequences of operations described with reference to the flowcharts and dataflow diagrams herein. For brevity, as used herein, a "loop" is a repeated group or set of operations or events performed by or at a computing device. For example, when copying a 128 kB file in 1 kB blocks, the loop comprises the 128 read operations interleaved with the 128 write operations.

As used herein, an "iterator" is a portion of processor-executable code that causes the operations of a loop to take place. The portion can include a single instruction, e.g., x86 "REP MOVSB"; a contiguous block of instructions, e.g., x86 "L: MOV ES:[CX], 42; LOOP L"; or a discontiguous block or collection of blocks of instructions. An iterator can be implemented, for example, using hardware loop support (such as the x86 REP prefix or LOOP instruction), conditional jump instructions, comparisons followed by jumps (e.g., x86 "CMP AX, 1337; JNE L"), conditionally-executed instructions (e.g., the ARM MOVEQ, which combines the MOV instruction with the EQ condition), recursion, tail recursion, repeated incrementing or decrementing of a register or variable, memory wraparound (e.g., executing sequentially until the instruction address register, IAR, reaches its maximum value and increments to its minimum value), proc or thread spawning, or other repeated-execution techniques.

Some examples form a histogram of the types of events representing the activities of the system components. Some examples use changes in the histograms over time to determine when loops begin or end. This permits describing a relatively larger number of events within a loop in terms of a relatively smaller number of loop parameters. This reduction of data volume can permit more readily determining whether the programs running those loops, or the operations within the loops, are suspicious.

In some examples, each of one or more monitored computing devices is equipped with a security agent (e.g., a service or daemon proc) to monitor events on that device. Those monitored computing devices may be in communication with devices of a security service system, e.g., implemented using cloud technology. In other examples, events are collected from a program during a "detonation"

process in which the program is executed on an instrumented test system. "Sandboxed" detonation refers to executing the program in an environment that protects the test system. In some examples, instead of or in addition to sandboxing, detonation can be performed on a system that is restored to a known, clean configuration before each detonation.

Example techniques described herein may refer to procs and modules running on a computing device, e.g., in the context of detecting activities of malware or of attackers. However, the techniques may also apply to other non-malicious software, procs, or other system components. For example, techniques described herein can be used in determining relationships between procs or threads, or in analyzing causes of excess resource usage by procs. Accordingly, techniques discussed herein for filtering events may be used by, among others, anti-malware security researchers, white-hat vulnerability researchers, or other analysts of events. In some examples, events can associated with various system components, e.g., data streams; procs; operating systems; operating-system instances under a hypervisor; files; memory regions; central processing units (CPUs) or cores thereof; network interfaces or other communications devices; peripherals; fixed or removable storage devices; or add-in cards.

Some examples herein permit analyzing a data stream including data stored in, e.g., a file, a disk boot sector or partition root sector, or a block of memory, or a portion thereof. For brevity, the term "sample" herein refers to a data stream, or a portion of a data stream being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample.

Various entities, configurations of electronic devices, and methods for detecting malware are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Some examples herein relate to detection or classification of malware, e.g., newly-discovered malware. Some examples can detect unexpected behavior that may be indicative of malicious activity. Some examples herein relate to determining of computational models that can detect malware or that can classify files (or other data streams, and likewise throughout this discussion). For example, behavior patterns represented as distributions 314, determinations that modules are malicious or not, or other analysis results herein can be used as input to supervised training processes for neural networks. Classifications can include, e.g., malware vs. non-malware, type of malware (e.g., virus vs. Trojan), or family of malware (WannaCry, Cryptolocker, PoisonIvy, etc.). Some examples permit more effectively detecting or classifying malware samples, e.g., without requiring retraining of a computational model.

Throughout this document, "dirty" is used to refer to data streams associated with malware, feature vectors representing such data streams, or other values associated with, produced by, or indicative of malware or malicious behavior. "Clean" is used to refer to values not associated with, produced by, or indicative of malware or malicious behavior.

A "false detection" or "false positive" is a determination that a data stream is associated with malware when, in fact, that data stream is not associated with malware, or the data stream that is the subject of such a determination. A "false miss" or "false negative" is a determination that a data stream is not associated with malware when, in fact, that data stream is indeed associated with malware, or the data stream that is the subject of such a determination.

Illustrative Environments

FIG. 1 shows example scenarios 100 in which examples of malware-detection systems can operate or in which malware-detection methods such as those described herein can be performed. Scenarios 100 can be deployed, e.g., for responding to cyber-attacks, e.g., by detecting, analyzing, remediating, or mitigating the effects of, those attacks. Illustrated devices or components of scenarios 100 include computing device(s) 102(1)-102(N) (individually or collectively referred to herein with reference 102) (N≥1), computing devices 104(1)-104(K) (similarly referred to with reference 104) (K≥1), and computing devices 106(1)-106(M) (similarly referred to with reference 106) (M≥1). In some examples, any of N, K, and M may be the same as, or different from, any other of those.

In the illustrated example, computing device(s) 102(1)-102(N) can be computing nodes in a cluster computing system 108 ("computing cluster" or "cluster") having several discrete computing nodes (device(s) 102) that work together to accomplish a computing task assigned to the cluster 108 as a whole. In some examples, computing device(s) 104 or 106 can be clients of cluster 108 and can submit computing tasks to cluster 108 or receive task results from cluster 108. Computing devices 102(1)-102(N) in cluster 108 can, e.g., share resources, balance load, increase performance, or provide fail-over support or redundancy.

Some cluster-based systems can have all or a portion of the cluster deployed in the cloud, e.g., using a cloud service such as GOOGLE CLOUD PLATFORM. Cloud computing allows for computing resources to be provided as services rather than a deliverable product. For example, in a cloud-computing environment, resources such as computing power, software, information, or network connectivity are provided (for example, through a rental agreement) over a network, such as the Internet. Cloud resources can be provided for internal use within an organization or for sale to outside customers. In some examples, computer security service providers can operate cluster 108, or can operate or subscribe to a cloud service providing computing resources.

In other examples, cluster 108 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

In some examples, computing devices 102, 104, and 106 can intercommunicate to participate in or carry out malware detection as described herein. For example, computing devices 104 can be monitored computing devices. Monitored computing devices 104 can include or run security agents that provide events to computing devices 102. Computing devices 102 can process those events, and provide analysis results to computing devices 106.

Different devices or types of computing devices 102 and 104 can have different needs or ways of interacting with cluster 108. For example, cluster 108 can interact with discrete request/response communications to computing devices 104 to determine additional data. Additionally or alternatively, computing devices 104 can be data sources (e.g., running security agents) and can interact with cluster 108 with discrete or ongoing transmissions of event records to be handled. For example, a data source in a personal computing device 104(1) can provide to cluster 108 data of newly-installed executable files, e.g., after installation and before execution of those files; or of newly-launched procs.

In some examples, computing devices 102, 104, or 106 can communicate with each other or with other computing devices via one or more network(s) 110. For example, network(s) 110 can include public networks such as the Internet, private networks such as an institutional or personal intranet, or combination(s) of private and public networks. Communications between computing devices 102, 104, or 106 via network(s) 110 can be structured, e.g., according to a defined application programming interfaces (API), or multiple APIs. For example, data can be retrieved via network(s) 110, e.g., using a Hypertext Transfer Protocol (HTTP) request such as a GET to a Web Services or Representational State Transfer (REST) API endpoint. Data can be returned in formats including, but not limited to, Extensible Markup Language (XML); JavaScript Object Notation (JSON); Hypertext Markup Language (HTML); spreadsheet formats such as Comma-Separated Value (CSV); archive formats such as gzip; or others. Remote Procedure Call (RPC) APIs such as OSF DCE RPC or D-Bus, or other types of APIs, can additionally or alternatively be used for network communications. In some examples, communications can be implemented using Web techniques such as AJAX, Comet, or Web Sockets.

In some examples, computing devices 106(1)-106(M) interact with entities 112(1)-112(M) (shown in phantom) (individually or collectively, entities 112). Entities 112 can be security analysts working for a security service, in some examples. The number of entities 112 is the same as the number of computing devices 106 in this example; in other examples, those numbers are different. Additionally or alternatively, entities 112 can include systems, devices, parties such as users, or other features with which computing devices 106 can interact. For brevity, examples of entity 112 are discussed herein with reference to users of a computing system; however, these examples are not limiting. In some examples, a computing device 106 is operated by an entity 112, e.g., a security analyst, who requests result records 122 from cluster 108 via computing device 106. Computing device 106 then receives the result records 122 and presents the result records 122 to entity 112 via a user interface.

In some examples, malware-detection algorithms can be performed on a computing device 102. Search results can be presented on such computing devices or on other computing devices (e.g., computing devices 104 or 106) having one or more input devices, such as a physical keyboard, a soft keyboard, a touch screen, a touch pad, microphone(s), or camera(s). In some examples, functions described herein can be shared between one or more computing device(s) 102 and one or more computing device(s) 104 or 106. For example, events can be analyzed by computing device(s) 102 alone, or by any combination of at least two of a computing device 102, 104, 106 in a coordinated manner.

In illustrated example 114, computing devices 104 perform execution 116 of sample(s) 118, e.g., executables to be tested for the presence of malware. Computing devices 104 can record event records 120 during execution 116 and transmit the event records 120 via network 110 to computing devices 102. Computing devices 102 can analyze the event records 120 to determine suspicious events. Computing devices 102 can provide result record(s) 122 to computing device(s) 106. The result record(s) 122 can include analysis results, e.g., as discussed herein with reference to FIGS. 4-10.

In illustrated example 124, computing devices 104 or other systems can provide a sample 126 to computing devices 102 via network 110. Computing devices 102 can then perform execution 128 of sample 126, e.g., sandboxed detonation using CUCKOO or another detonation framework. Computing devices 102 can determine event records 130 during or after execution 128. Computing devices 102 can then analyze the event records 130 and provide result records 122. Examples 114 and 124 can be used individually or together. For example, some samples 118 can be analyzed as in example 114, and other samples 126 can be analyzed as in example 124.

A sample 118 or 126, e.g., an executable file or other data stream, can be associated with malware if, e.g., the data stream is itself, or includes, malicious code; the data stream is (or is likely) at least a portion of a grouping of malicious code (e.g., a formerly-benign file that has been modified by a file infector virus); the data stream is, or is output by, a generator commonly used for generating malware (e.g., a packer or installer); or the data stream is an input file relied on by malware (e.g., a large sequence of data designed to trigger a buffer overflow that will permit remote code execution, or shellcode embedded in a document file). In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with malware. Some generators are used for malware, and are also used for legitimate software. A determination that a data stream is associated with malware does not necessarily require or guarantee that the data stream in fact be malware. In some examples, determinations herein (e.g., result records 122 or outputs from operations 408 or 712) can be used by a security analyst in triaging data streams, and can permit the security analyst to readily separate data streams based on a likelihood they are in fact malware. In some examples, a computer-security system can delete or quarantine files associated with malware, or terminate procs launched from data streams associated with malware.

In some examples, malware comprises malicious data instead of or in addition to malicious code. Such data is also considered to be associated with malware. For example, some programs may have bugs that prevent them from correctly processing certain inputs. Examples include Structured Query Language (SQL) injection attacks, in which a benign program populates a query with unescaped external data. For example, the query template "SELECT cost from Products WHERE name LIKE '%{$name}%';" can be abused by providing malicious data to be populated in place of the placeholder "{$name}". When the malicious data $name="foo'; DROP TABLE Products; --" is substituted into the query template, for example, the resulting query will cause the "Products" table of the database to be deleted ("dropped"), causing unexpected loss of data. In another example, malicious data can include malformed UTF-8 (Unicode Transformation Format-8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

Except as expressly indicated otherwise, a determination of whether a data stream is associated with malware is carried out programmatically by or using catalogs or other techniques herein. Various examples herein can be performed without human judgment of whether a program or data block is in fact malicious. Techniques herein can permit more readily identifying potential computational threats, e.g., in the context of an antivirus program, cloud security service, or on-premises security appliance.

In some examples, any of computing device(s) 102, 104, or 106 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out malware detection or other operations described herein, e.g., for event-analysis purposes, e.g., in support of malware or attack detection.

Network(s) 110 can include any type of wired or wireless network, including but not limited to personal area networks (PANs) such as BLUETOOTH and ZIGBEE, local area networks (LANs) such as Ethernet and WI-FI, wide area networks (WANs), satellite networks, cable networks, WiMAX networks, cellular mobile communications networks (e.g., 3G, 4G, and so forth) or any combination thereof. Network(s) 110 can utilize communications protocols, such as, for example, packet-based or datagram-based protocols such as Internet Protocol (IP), Transmission Control Protocol (TCP), User Datagram Protocol (UDP), other types of protocols, or combinations or IP-based evolutions thereof. Moreover, network(s) 110 can also include a number of devices that facilitate network communications or form a hardware infrastructure for the networks, such as switches, routers, gateways, access points, firewalls, base stations, wireless access points (WAPs), repeaters, backbone devices, and the like. Network(s) 110 can also include devices that facilitate communications between computing devices 102 or 104 using bus protocols of various topologies, e.g., crossbar switches, INFINIBAND switches, or FIBRE CHANNEL switches or hubs.

As noted above, network(s) 110 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Illustrative Configurations and Data Structures

Figure 2:
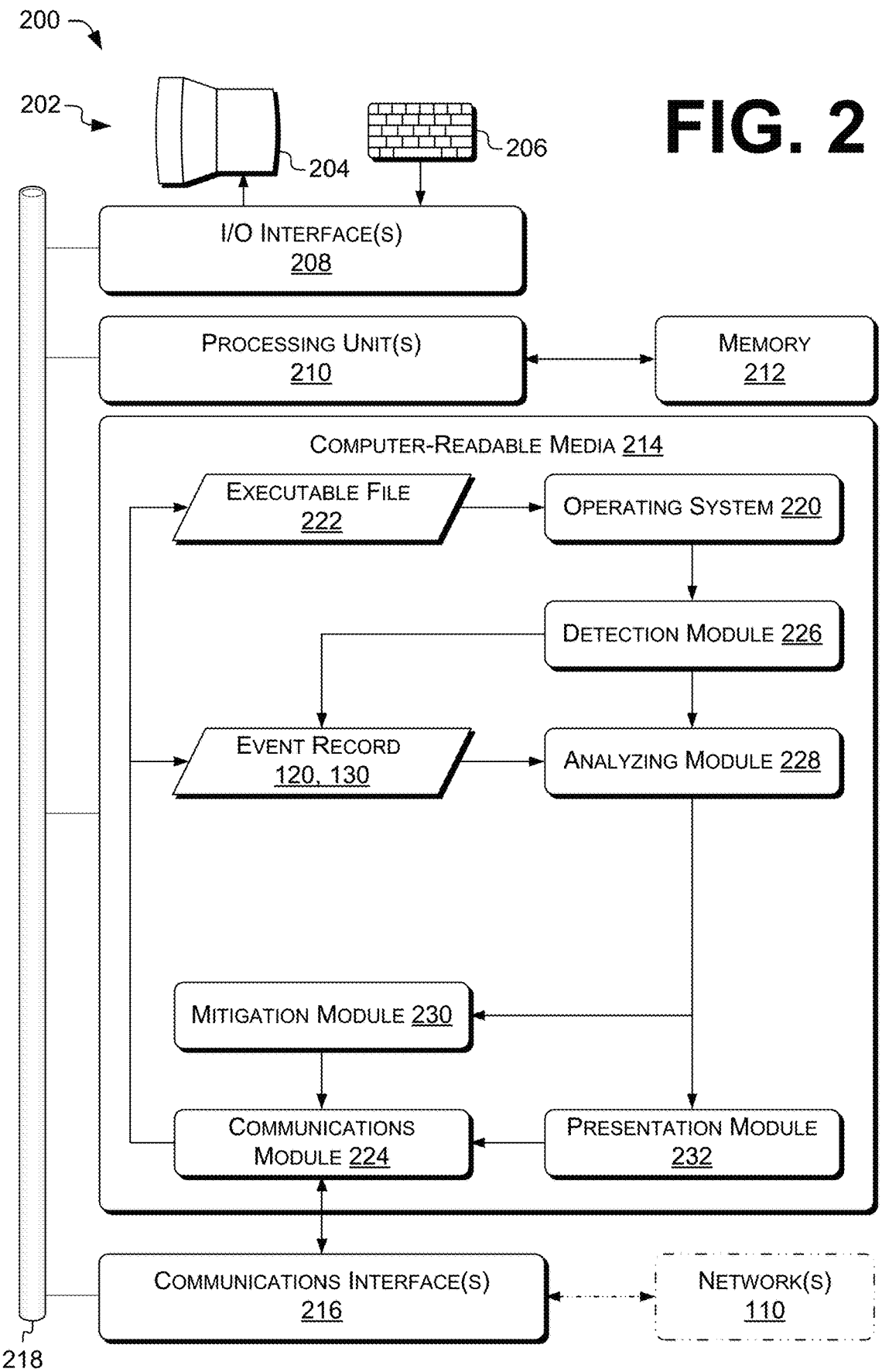
FIG. 2 is a block diagram depicting an example computing device configured to participate in malware detection.

FIG. 2 is an illustrative diagram that shows example components of a computing device 200, which can represent computing device(s) 102, 104, or 106. Computing device 200 can be, implement, include, or be included in, a system, device, or apparatus, or portion thereof, for detecting malware or for performing detonation as described herein.

Computing device 200 can include or be connected to a user interface (UI) 202. In some examples, UI 202 can be configured to permit a user, e.g., entity 112, to retrieve result records 122 or other information about suspicious events, or to control or otherwise interact with cluster 108 or computing devices 102 therein. Accordingly, actions such as presenting information of or corresponding to a result record 122 to entity 112 can be taken via UI 202.

In some examples, UI 202 can include one or more output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display. Display 204 can be a component of a touchscreen, or can include a touchscreen.

UI 202 can include one or more input devices, which can be integral or peripheral to computing device 200. The input devices can include user-operable input device 206 (depicted as a keyboard), or device(s) configured for input from other computing device(s) 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 112, via UI 202.

Computing device 200 can further include one or more input/output (I/O) interface(s) 208 to allow computing device 200 to communicate with input, output, or I/O devices. Examples of such devices can include components of UI 202 such as described above. Other examples of such devices can include power meters, accelerometers, and other devices for measuring properties of entity 112, computing device 200, or another computing device 102, 104, or 106. Input data, e.g., of user inputs on user-operable input device 206, can be received via I/O interface(s) 208. Output data, e.g., of UI screens, can be provided via I/O interface(s) 208 to display 204, e.g., for viewing by entity 112.

The computing device 200 can include a processing unit 210. In some examples, processing unit 210 can include or be connected to a memory 212, e.g., a main RAM or a cache. Processing unit 210 can be operably coupled to the I/O interface 208 and to at least one computer-readable media 214 (CRM), e.g., at least one tangible non-transitory computer-readable medium or other computer storage medium. In some examples, CRM 214 can store instructions executable by the processing unit 210, or instructions executable by external processing units such as by an external CPU or other processor. Any of these instructions are referred to herein as computer-executable instructions or processor-executable instructions.

Processing unit 210 can be or include one or more single-core processors, multi-core processors, CPUs, graphics processing units (GPUs), general-purpose GPUs (GPGPUs), or hardware logic components configured, e.g., via specialized programming from modules or APIs, to perform functions described herein. Accordingly, although processing unit 210 is described in singular terms for brevity, computing device 200 can include any number of processors or other components described above. For example, processing units 210 can be or include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit 210 can represent a hybrid device, such as a device from ALTERA or XILINX that includes a CPU core embedded in an FPGA fabric. These or other hardware logic components can operate independently or, in some instances, can be driven by a CPU.

In some examples, at least one computing device 102, 104, or 106, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for GPUs and CPUs. In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media and communication media. Computer storage media includes tangible, non-transitory storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by processing unit 210 or other components of computing device 200.

In contrast to computer storage media, communication media can embody computer-readable instructions, data structures, program modules, or other data in a modulated data signal, such as a carrier wave, or other transmission mechanism. As defined herein, computer storage media does not include communication media.

The computing device 200 can also include a communications interface 216, which can include a transceiver device such as a network interface controller (NIC) to send and receive communications over a network 110 (shown in phantom), e.g., as discussed above.

Communications interface 216 can include any number of network, bus, or memory interfaces, in any combination, whether packaged together or separately. In some examples, communications interface 216 can include a memory bus internal to a particular computing device 200, transmitting or providing data via communications interface 216 can include storing the data in memory 212 or CRM 214, and receiving via communications interface 216 can include retrieving data from memory 212 or CRM 214.

In some examples, the communications interface 216 can include, but is not limited to, a transceiver for any wired or wireless network, such as those described herein with reference to FIG. 1. The communications interface 216 can include a wired I/O interface, such as a serial interface, a Universal Serial Bus (USB) interface, or other wired interfaces. The communications interface 216 can additionally or alternatively include at least one user-interface device or UI 202, at least one bus such as a memory bus or local bus, at least one memory interface, or at least one hardwired interface such as a 0-20 mA control line.

In some examples, the processing unit 210 can access data on the CRM 214 via a bus 218. I/O interface 208 and communications interface 216 can also communicate with processing unit 210 via bus 218. For example, communications interface 216 can exchange data with UI 202 via bus 218 and I/O interface(s) 208. Bus 218 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

In some examples, CRM 214 can store instructions of an operating system (OS) 220. CRM 214 can additionally or alternatively store at least one executable file 222, which can be an example of a system component, a data stream, or a sample 118 or 126. In some examples, OS 220 can cause processing unit 210 to load computer-executable instructions from executable file 222 into a RAM or other high-speed memory, e.g., memory 212, or to otherwise prepare computer-executable instructions from executable file 222 for execution by processing unit 210. Some examples, e.g., bare-metal embedded-systems configurations, can include a loader but not an OS 220. OS 220 can additionally or alternatively load other types of files, e.g., data files.

In some examples, computing device 200 operates a hypervisor, virtualization environment, sandbox, or other software or firmware layer in addition to executable file 222, OS 220, and the hardware shown as components 210-218. In some of those examples, CRM 214 can represent a CRM or portion of a CRM accessible to a virtualization guest, and OS 220 can represent the virtualization guest OS. In some examples, OS 220 can represent a sandboxed environment in which executable file 222 is executed. In other examples, executable file 222 can execute directly on a non-virtualized OS 220 that accesses non-virtualized components 210-218.

In some examples, a "control unit" as described herein includes processing unit 210. A control unit can also include, if required, memory 212, CRM 214, or portions of either or both of those. For example, a control unit can include a CPU or DSP and a computer storage medium or other tangible, non-transitory CRM storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing executable instructions. Accordingly, references herein to computer-executable instructions also refer to wiring or configuration to cause control units that do not use computer-executable instructions to perform the described functions.

Computer-executable instructions or other data stored on CRM 214 can include a communications module 224, a detection module 226, an analyzing module 228, a mitigation module 230, a presentation module 232, or other modules, programs, or applications that are loadable and executable by processing unit 210. Processing unit 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the OS 220 or the above-listed modules 224-232. In some examples, computer-executable instructions on CRM 214 can additionally or alternatively include instructions of a Web browser, smartphone app or desktop application, background service conducting or monitoring network communications, or instant-messaging client, or can include components of any of those configured to perform functions described herein (e.g., of detection module 226). Such programs or components can invoke or include functions of any of the listed modules.

In some examples not shown, one or more of the processing unit 210 in one of the computing device(s) 102 or 104 can be operably connected to CRM 214 in a different one of the computing device(s) 102 or 104, e.g., via communications interface 216 (discussed below) and network 110. For example, program code to perform steps of flow diagrams herein, e.g., as described herein with reference to modules 226 or 232, can be downloaded from a server, e.g., a computing device 102, to a client, e.g., a computing device 104 or 106 respectively, e.g., via the network 110, and executed by one or more processing units 210 in that computing device 104 or 106.

In some examples, the OS 220 can include components that enable or direct the computing device 200 to receive data via various inputs (e.g., user controls such as user-operable input device 206, network or communications interfaces such as communications interface 216, devices implementing memory 212, or sensors), and process the data using the processing unit 210 to generate output. The OS 220 can further include one or more components that present the output (e.g., display an image on an electronic display 204, store data in memory 212, or transmit data to another computing device 102, 104, or 106. The OS 220 can enable a user (e.g., entity 112) to interact with the computing device 200 using a UI 202. Additionally, the OS 220 can include components that perform various functions generally associated with an operating system, e.g., storage management and internal-device management. In some examples, the OS 220 or other modules stored in the CRM 214 can be configured to load part or all of a set 618 of catalogs from CRM 214 into memory 212 or other relatively higher-speed storage for access by processing unit 210.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the detection module 226 and the analyzing module 228 can be combined in a single module that performs at least some of the example functions described below of those modules, as likewise the communications module 224 and the detection module 226 (e.g., on a monitored computing device 104), or the analyzing module 228 and the mitigation module 230. In some examples, CRM 214 can include a subset of the above-described modules.

In the illustrated example, detection module 226 can detect events and provide corresponding event records 120. Additionally or alternatively, communications module 224 can receive event records 120 describing events. Analyzing module 228 can determine whether sequences of events are associated with malware, or locate malware modules, as discussed herein with reference to at least FIG. 4 or 7. Communications module 224 can provide the result records 122 indicating the sequences of events or modules that are associated with malware, e.g., to a computing device 106 or a UI 202.

In some examples, the communications module 224 or another module stored in CRM 214, executing at a computing device 104, can be configured to receive event records 120, e.g., via user-operable input device 206, communications interface(s) 216, or a filesystem, and to provide the event records 120 to a computing device 102. In some examples, communications module 224 or presentation module 232, running at a computing device 106, can be configured to transmit queries to a computing device 102, receive responses from computing device 102, and present the responses, e.g., via display 204. In some examples, analysis of events is carried out on computing device(s) 102. In some examples, analysis of events is carried out partly on computing device(s) 102, and partly on at least one of a computing device 104 or a computing device 106. In some examples, event records 120, result records 122, or other transmissions described herein can be conducted, e.g., in the form of HTTP requests transmitted via TCP connections. For example, an HTTP request conveying a record, e.g., in a body of the request, can also include a URL parameter, HTTP cookie, or other data carrying identifying information or credentials associated with the record. Result records 122 and other transmissions herein can be conducted in an HTTP response header or body, or other response to a request or unprompted transmission.

In some examples, detection module 226 can include a hypervisor-level, kernel-level, or user-level security agent. In various embodiments, the kernel-level security agent can be installed on the host computing device in the form of a driver. For example, a driver or other implementation of detection module 226 can use hooks or filter drivers, or monitor memory (e.g., using OS- or CPU-supplied interfaces) or log files (e.g., using tail(1)).

In some examples, the kernel-level security agent can operate on computing device 104 as a virtual machine/shadow operating system. The kernel-level security agent loads before the operating system of the host computing device, e.g., very early in the boot-time of the host computing device, by some of the first few dozen instructions in some examples. Pre-boot components of detection module 226 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 226 can be received from or operable with a security service. Such a security service may be implemented as a cloud of security service devices (referred to herein as a "security service cloud" or a "remote security system"). The security service cloud can, e.g., install the detection module 226 on the computing device 104, receive event records 120 or other notifications of observed events from the detection module 226, perform analysis of data associated with those events, perform healing of the host computing device, or generate configuration updates and provide those updates to the detection module 226. These or other interactions between the kernel-level security agent and the security service cloud can enable a detection loop that defeats the malware update loop of adversaries.

In some examples, detection module 226 can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record 120 including the forensic data.

In various embodiments, a collector may register with a hook or filter driver offered by the operating system to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 226. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 226 may include user-mode collectors to observe events that may not be visible to kernel-mode procs. Such events could include, for example, rendering of display graphics for display on a display screen of the computing device 104. To observe these events, the detection module 226 can be configured to load user-mode collectors as user-mode modules of the computing device 104. Like the kernel-mode collectors described above, user-mode collectors may observe multiple kinds of events or activities, or each kind may be associated with a different user-mode collector. The events observed by the user-mode collectors may be specified by a configuration of the detection module 226. In some embodiments, the user-mode collectors observe all user mode events on the computing device 104 and the configuration specifies configurable filters for filtering and dispatching the events. In other embodiments, the configuration specifies which user-mode collectors should be loaded to observe specific types of events. In yet other embodiments, the configuration both specifies which user-mode collectors should be loaded and configurable filters for filtering and dispatching those events.

In some examples, the detection module 226 can build and maintain a model representing chains of execution activities and genealogies of procs. This model can be used to track attributes, behaviors, or patterns of procs executing on the computing device 104 and can enable an event consumer to determine when an event should be reported to the analyzing module 228. Upon determining an occurrence of an event, the event consumer can perform any or all of: determining whether or not to ignore the event based at least in part on information stored in the situational model; updating the situational model and performing further observation, generating an event record 120, 130 to represent the determination that an event has occurred, notifying the security service cloud of the event (e.g., by transmitting event record 120 to the security service cloud, e.g., in cluster 108), or healing the host computing device by halting execution of a proc associated with malicious code or deceiving an adversary associated with the malicious code. In various embodiments, any or all of the observing, filtering, routing/dispatching, and/or utilizing of event consumers may occur in parallel with respect to multiple events.

For example, a ransomware sample 126 may include a WINDOWS batch file or UNIX shell script that repeatedly invokes gpg or another encryption program to encrypt the files in each of multiple directories. During real-time operation on a computing device 104, or during detonation, the genealogy of gpg procs can be traced back to the batch file or shell script in an execution-chain model. An event consumer can determine that a "file open" event should be reported, e.g., if the event comes from a gpg process launched by a batch file, as determined via inspection of the execution chains represented in the situational model.

By detecting events based on chains of execution activities of the host computing device and other data described above, rather than on fixed signatures, the kernel-level security agent is able to better detect procs associated with malicious code. While adversaries can easily change malware to avoid signature-based detection, it is significantly more difficult to avoid detection by an agent that monitors and analyzes events. Cluster 108 or other implementations of analyzing module 228 can then process events from multiple computing devices 104 to detect more complex patterns of malicious activity.

Various examples described above, e.g., collectors, filters, routers/dispatchers, event consumers, models of execution chains, or other security-relevant operations or data, can additionally or alternatively be implemented as part of a detonation environment. This can permit evaluating the behavior of the sample 126 equally effectively either in production or in a research environment. In some examples, detonation can be carried out on a computing device 102 or a computing device 104.

Figure 3:
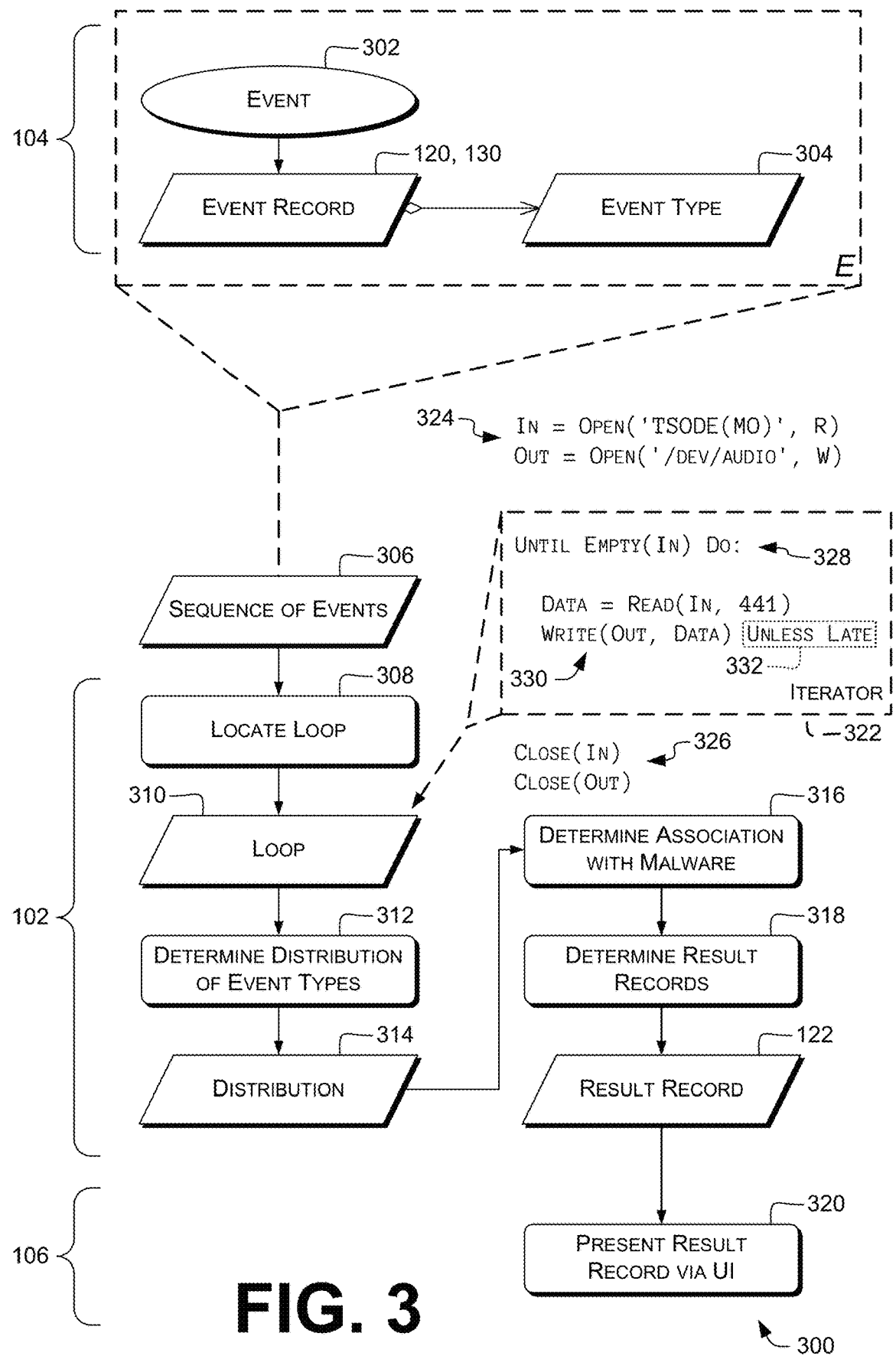
FIG. 3 illustrates components and dataflow involved in an example malware-detection system.

FIG. 3 is a diagram 300 illustrating components and dataflow in an example malware-detection system. Illustrated data items can be stored in CRM 214, and illustrated operations can be carried out by computing device(s) 200. Portions of FIG. 3 are described with respect to a single event; however, the described operations can be carried out with respect to any number of events. Details of each of these operations are described herein with reference to FIGS. 4-10. The left side of the figure illustrates a division of functions between devices in FIG. 1 according to example 114. This is not limiting; example 124 can additionally or alternatively be used to implement operations described here.

In some examples, detection module 226 running on a computing device 104 detects an event 302, or multiple events. Detection module 226 produces an event record 120 including data describing the event 302. For example, the event record 120 can include an event type 304 of the event 302. Nonlimiting example event types 304 can include, e.g., "proc created," "file opened," "network connection established," or "DNS request made." Other event types 304 are described below. The events can be associated with an execution set. The execution set can include at least one proc, thread, or other unit of execution. For example, an execution set can include a proc and its children, or a chain of execution leading to a proc. The events 302 can be detected at runtime or during detonation, as described herein. In some examples, the execution set includes those system components being monitored for events.

In some examples, detection module 226 produces a sequence of E events, represented by the plate marked "E" in FIG. 3. Each event e has a respective event record 120, and each event record 120 has a respective event type 304. The E events form a sequence 306 of events e1 . . . $e_E$. The events are ordered in sequence 306 in substantially the order they occurred or were detected, although cache-coherency limitations or other timing factors in, e.g., a multiprocessing system may cause some events to be recorded in sequence 306 slightly out of their order of detection or occurrence.

Throughout this document, an event record 120, or any other record described herein, can include one or more fields, each of which can have a name or other identifier, and each of which can include or be associated with one or more values. For example, event record 120 or other records herein can be represented as ASN.1-defined data structures, GOOGLE protobufs, JSON records, XML documents or subtrees, associative arrays, or other forms of tagged or key-value storage. In some examples, the event type 304 can represent a change in one or more data value(s), e.g., of the types listed below. For example, the launch of a process or modification of a file can trigger an event of a corresponding event type 304.

Examples of fields can include, but are not limited to, event timestamps, filenames, inode numbers, file timestamps, filehandles, hashes of files (e.g., SHA-256 hashes), userids or other user identifiers (e.g., WINDOWS SIDs), groupids, proc identifiers (PIDs), e.g., of a proc or its parent, proc group IDs (PGIDs), proc output (e.g., to stdout or stderr), proc exit codes, filenames of executables' primary modules, session identifiers, proc command lines, raw or decoded, command-line histories, universally unique identifiers (UUIDs), operating-system identifiers, e.g., from uname(1), permissions, access-control lists (ACLs), security-event indications (e.g., "logon," "logoff"), security credentials, logon times, subsystem identifiers (e.g., console vs. graphical), virtual host identifiers (e.g., in a hypervisor-managed system), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 226 (e.g., a version number), values from the registry, dotfiles, or other configuration data (e.g., crontab entries), call-stack entries, domain names (e.g., relative or full-qualified, FQDN), hostnames being resolved (e.g., using DNS), identifiers of the corresponding monitored computing devices 104 or the organizations to which they belong, names or other identifiers of mutexes, named pipes, or other inter-thread communication or inter-proc communication (IPC) mechanisms, a bus path, vendor/product ID pair, or other identifier of an accessory (e.g., an add-in card, USB device, or other connectible device) or other system component, or counts (e.g., of VIRUSTOTAL dirty indications).

In some examples, field values associated with an event 302 indicating an action taken or attempted by a proc can report the corresponding values before the action, after the action, or both (e.g., filename before or after a rename, or both). In some examples, field values can include the results of applying transform(s) to any of the above, e.g., to smash case or otherwise filter or preprocess the data. In some examples, an event record 120 can include information about a proc that is currently running on the computing device 104, or that has previously run on the computing device 104. In some examples, an event record 120 can include information about at least one currently-running proc and at least one related proc (e.g., still running or already terminated), e.g., a parent proc of the currently-running proc.

In some examples, at operation 308, analyzing module 228 running on a computing device 102 can locate a loop 310 in the sequence 306 of events. The loop can represent any repeated sequence of events. For example, copying a file involves repeatedly, in a loop, reading the source file and writing the destination file. Analyzing module 228 can detect a portion of the sequence 306 including many read and write operations, and relatively few other operations, as a loop. The loop can be performed by, or associated with, an iterator defined, e.g., by range(s) of memory addresses including instructions executed during the loop, or boundaries of such range(s). Examples are discussed herein, e.g., with reference to FIGS. 10 and 11.

In some examples, at operation 312, analyzing module 228 can determine a distribution 314 of event types of the events within the loop. For example, analyzing module 228 can determine a histogram of the event types 304, in which each event type 304 is associated with the number of events 302 that had that event type 304. For the file-copy example, the histogram will include strong peaks for Read and Write events, but not for other events.

In some examples, the distribution 314 can include a histogram normalized to percentage, i.e., in which each event type 304 is associated with the percentage of detected events 302 that had that event type 304, rather than with the number of events 302 that had that event type 304. In some examples, the distribution 314 can include total counts or percentages of all event types, and a histogram of fewer than all event types. Examples are discussed herein, e.g., with reference to operation 406, Table 1, or FIG. 10.

In some examples, at operation 316, analyzing module 228 can determine that the sequence of events is associated with malware based on the distribution 314. For example, analyzing module 228 can consult a pattern catalog to determine whether the distribution 314 matches a known-good or known-bad pattern.

In some examples, at operation 318, analyzing module 228 or presentation module 232 can determine result records 122. Operation 318 can include transmitting the result records 122 via network 110.

In some examples, at operation 320, presentation module 232 or another module running on a computing device 106 can present the result records 122, e.g., via the UI 202. For example, the presentation module 232 can present the result records 122 in a list in descending order of severity, indicated by tag data associated with a "Severity" tag; in time order; or in another order. The presentation module 232 can present the results in graphical, textual, or other forms, e.g., using list controls, tree controls, audio outputs, or other types of output such as those discussed above with reference to display 204 and other output devices of UI 202. For example, the presentation module 232 can transmit HTML or JAVASCRIPT code representing the result record 122 for presentation by a Web browser of UI 202. In some examples, a security analyst (or other entity 112) using a computing device 106 can search events and view search results corresponding to suspicious events.

In some examples, mitigation module 230 can additionally or alternatively perform remediation or mitigation actions, such as quarantining or terminating a malware module. Mitigation module 230 can perform remediation or mitigation operations at computing device 104, as a result of a local decision or in response to a command from a computing device 102 or 106.

In some examples, at least one result record 122 can include a classification. The classification can include, e.g., a bitmask, attribute list, or other representation of categories to which a particular event or related system component belongs, or tags with which the particular event or system component is associated. For example, a classification can include a Boolean value indicating whether or not the event or system component is suspicious (e.g., associated with malware), or an enumerated value indicating with which of several categories the event or system component is associated (e.g., "benign," "virus," or "spyware"). The classification can additionally or alternatively include one or more confidence values or other values indicating the likelihood of a classification, e.g., a "spyware" value of 0.42 indicating a 42% likelihood that a particular newly-created proc is spyware. In an example, the classification can include multiple confidence values for respective categories of malware or other fields (e.g., "spyware=0.42; worm=0.05"). In some examples, result records 122 and data therein can be used by a security analyst in triaging or analyzing events.

FIG. 3 also shows details of a nonlimiting example iterator 322. In some examples, iterator 322 can produce the sequence 306 of events in which is detected loop 310. Also shown is setup 324, which happens before iterator 322 executes, and teardown 326, which happens after iterator 322 executes. In other examples, setup 324 and teardown 326 can be considered as part of iterator 322. Iterator 322 includes a condition 328 ("until empty") and a body 330 ("read", "write"). Body 330 will be executed repeatedly under control of condition 328. Condition 328 is shown as being tested before each execution of body 330, but this is not limiting. Condition(s) can be tested before, after, or during executions of body 330, or any combination of any of those.

The illustrated example is an audio-streaming loop. Setup 324 opens an input file, "TSODE(MO)", for reading ("R"), and an output file, "/dev/audio" (e.g., an audio-streaming device), for writing ("W"). Code within iterator 322 repeatedly reads a frame of data of the input file, each frame including 441 samples (10 ms of CD-quality audio), and writes that frame to the output file. Body 330 will be executed until the input file is empty, as specified by condition 328. Once the input file is empty, iterator 322 terminates. Teardown 326 then closes the input and output files.

Body 330 includes a conditional 332 ("unless late"). The body of iterator 322 should execute exactly every 10 ms. However, system load or higher-priority tasks may prevent that from happening. In order to catch up, body 330 does not write the current frame of audio data if that frame is late, i.e., should have been written earlier. This condition is tested by conditional 332. Accordingly, the execution of the "write" statement is controlled by conditional 332. As a result, body 330 may execute—and loop 310 may include—the same number of writes as reads, if no frames are late, or fewer writes than reads, if at least one frame is late.

Illustrative Processes

Figure 4:
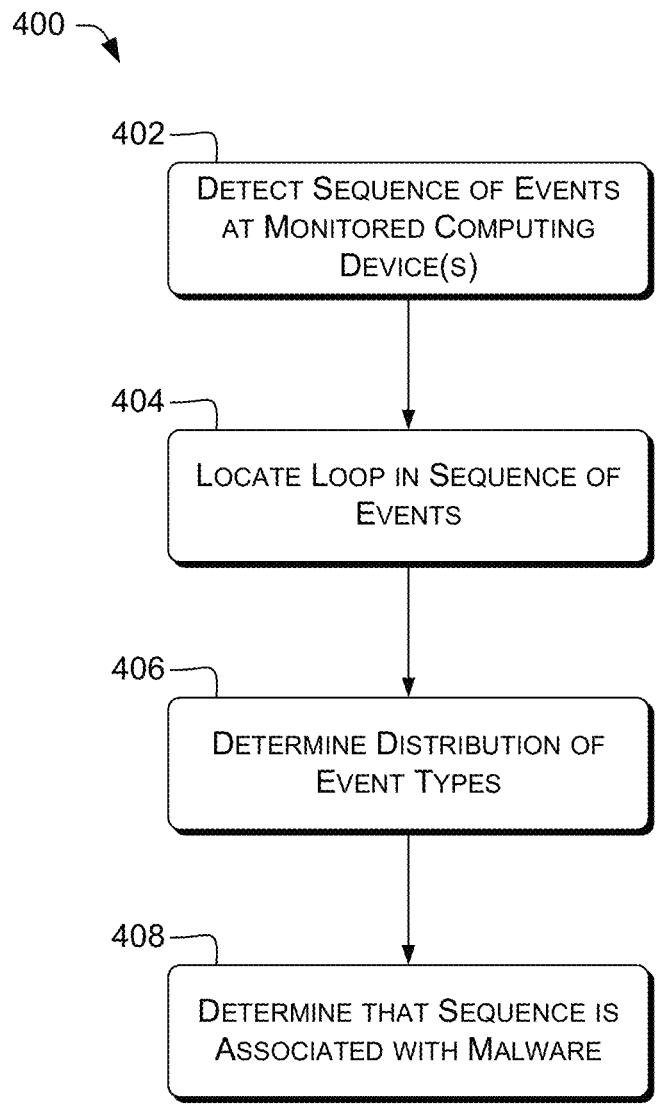
FIG. 4 illustrates an example process for determining that a sequence of events is associated with malware.

FIG. 4 is flowchart of an example process 400 for determining that a sequence of events at a monitored computing device, e.g., a sequence produced by an execution set running on the monitored computing device, is associated with malware. Example functions shown in FIG. 4, and in other flow diagrams and example processes herein, such as FIGS. 5-9, can be implemented on or otherwise embodied in one or more computing device(s) 102, 104, or 106, e.g., a computing device 200, e.g., using software running on such device(s), e.g., software executed by processing unit 210. For the sake of illustration, the example process 400 is described below with reference to processing unit 210 and other components discussed with reference to FIGS. 1 and 2 (e.g., a control unit), and with respect to data items and operations shown in FIG. 3, that can carry out, participate in, or be processed by the steps of the example process 400. However, other processing unit(s) such as processing unit 210 or other components of computing device(s) 102,104, or 106 can carry out step(s) of described example processes such as process 400. Similarly, example method(s) or process(es) shown in FIGS. 5-9 also can be, but are not limited to being, carried out by any specifically-identified components.

In software embodiments of the processes, e.g., illustrated in FIGS. 4-10, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram or process is not intended to be construed as a limitation, and any number of the described operations can be combined in any order or in parallel to implement each process. In each flow diagram, fewer than all of the depicted operations can be performed, except as expressly noted. Moreover, the operations in each of FIGS. 4-9 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

In some examples, at operation 402, detection module 226 can detect the sequence 306 of events 302. In some examples, e.g., of detection operating at a monitored computing device 104, the events 302 occur at a single monitored computing device 104. In some examples, e.g., of detection operating in cluster 108, each event 302 occurs at a monitored computing device 104 of one or more monitored computing devices 104. Events 302 of the sequence 306 of events 302 are produced by at least one process or at least one thread, in some examples.

Each event 302 has an event type 304, and detection module 226 can provide data of the event types 304. In some examples, the respective event types 304 can be any of, or can be selected from the group consisting of, a system-call type, an API-call type, an I/O request packet (IRP) type, or an IPC-message type.

In some examples, an event type 304 can indicate at least one of the following types of events 302: a user logging on or off, detection module 226 starting up or shutting down, a proc being created, a network name being looked up (e.g., via DNS), a network connection being initiated or established (e.g., IPv4 or IPv6), a value in an auto-start entry point (ASEP) being created or modified, an executable being created, modified, or deleted, a critical system file being modified, a file of a specific type or extension being created or updated (e.g., based on a database listing the specific type(s) or extension(s) to be monitored), a new scheduled task or daemon being registered or otherwise set up to execute at a future time or on a schedule, or a proc making or attempting an access to a portion of a disk, memory, or other system resource not allocated to that proc.

Individual events 302 can be associated with software in an execution set, e.g., as described above. For example, an event 302 can be performed by or at the request of software in the execution set. In some examples, the execution set comprises at least a proc or a thread. In some examples, the execution set comprises at least one thread. In some examples, the execution set consists of one or more threads, e.g., one thread or two threads.

In some examples, detection module 226 can include or communicate with a "sensor" or "security agent," e.g., a software program, or firmware or hardware subsystem, that collects information of the events 302. In some examples, the sensor can be implemented using a kernel-mode component, e.g., a device driver or other module that hooks file- and proc-related system calls and records information regarding those calls (e.g., parameters or results thereof). In some examples, detection module 226 can execute during detonation, e.g., sandboxed detonation.

In some examples, cluster 108 can receive event records 120 from monitored computing devices 104. Each event record 120 can be associated with a particular monitored computing device 104 and an event type 304. For example, detection modules 226 at respective monitored computing devices 104 can provide the event records 120 to computing device(s) 102 via communications modules 224. Analyzing module 228 can then execute at the computing device(s) 102 to carry out functions described with reference to FIG. 4 or 5. In some examples, computing device(s) 102 can query monitored computing devices 104 for stack traces or other information. This can permit computing device(s) 102 to carry out functions described with reference to FIG. 6-9 or 11. Performing analysis at computing device(s) 102 can permit detecting malicious event sequences spread across multiple monitored computing devices 104. For example, a networked ransomware program might compromise two monitored computing devices 104 ("A" and "B"). Device A might encrypt files, and device B might delete unencrypted files. The activity of device A might be considered legitimate on its own, as might the activity of device B on its own. Analyzing an event sequence including events from both device A and device B can permit detecting the malicious activity, e.g., distributed ransomware execution.

In some examples, at operation 404, analyzing module 228 can locate a loop 310 within the sequence 306 of events 302 based at least in part on relative frequencies of the event types 304. Examples are discussed herein, e.g., with reference to operation 308, FIG. 5, operation 704, or FIG. 10. In some examples, e.g., as discussed herein with reference to operations 510 or 514, the loop 310 is defined at least partly by a boundary.

In some examples, at operation 406, analyzing module 228 can determine a distribution of event types 304 of the events 302 within the loop. Examples are discussed herein, e.g., with reference to operation 312 or FIG. 5 or 10. For example, analyzing module 228 can determine a histogram of the event types 304 of the events 302 within the loop, or of the n event types 304 that occur most frequently within the loop. In some examples, a loop can include other loops nested within it, or a loop can be included within an outer loop. In an example of copying multiple files, an inner loop includes read and write events. An outer loop includes file-open and file-close events. The outer loop includes the inner loop executed separately for each file to be copied, in this example. Accordingly, the distribution of event types 304 can include relatively higher numbers of inner-loop events, e.g., reads and writes in the multiple-file-copy example, and relatively lower numbers of outer-loop events, e.g., file-open and file-close events in that example. In some examples, the relative numbers of different event types can be used to distinguish inner loops from outer loops.

In some examples, the distribution 314 of event types 304 comprises: a histogram of at least some of the event types of the events within the loop; and a count of occurrences of at least one event type not included in the histogram. For example, the histogram can include data fewer than all of the event types 304 in the sequence 306 of events 302. In some examples, the histogram includes data for the n most-frequently-occurring event types 304, and the count of occurrences includes counts of event type(s) 304 not in the histogram, or of event type(s) 304 not in the histogram and of event type(s) 304 in the histogram. The count of occurrences can be maintained in a buffer with least-recently-used (LRU)-first eviction. For example, the number of inner-loop events may overwhelm the number of outer-loop events. Using a buffer to count overall events can permit determining event types for both inner and outer loops, even if the length of an inner loop is longer than a size of a processing window over which the distribution is being computed, as discussed herein.

In some examples, at operation 408, analyzing module 228 can determine that the sequence of events, or the execution set that generated it, is associated with malware based at least in part on the distribution of event types 304 within the loop. Examples are discussed herein, e.g., with reference to operations 316, 614, 620, or 624. For example, unexpected changes in the distribution of events produced by a particular execution set can indicate that malware is present in that execution set. Additionally or alternatively, a match to a distribution known to be associated with malware can indicate that malware is present in the execution set.

Figure 5:
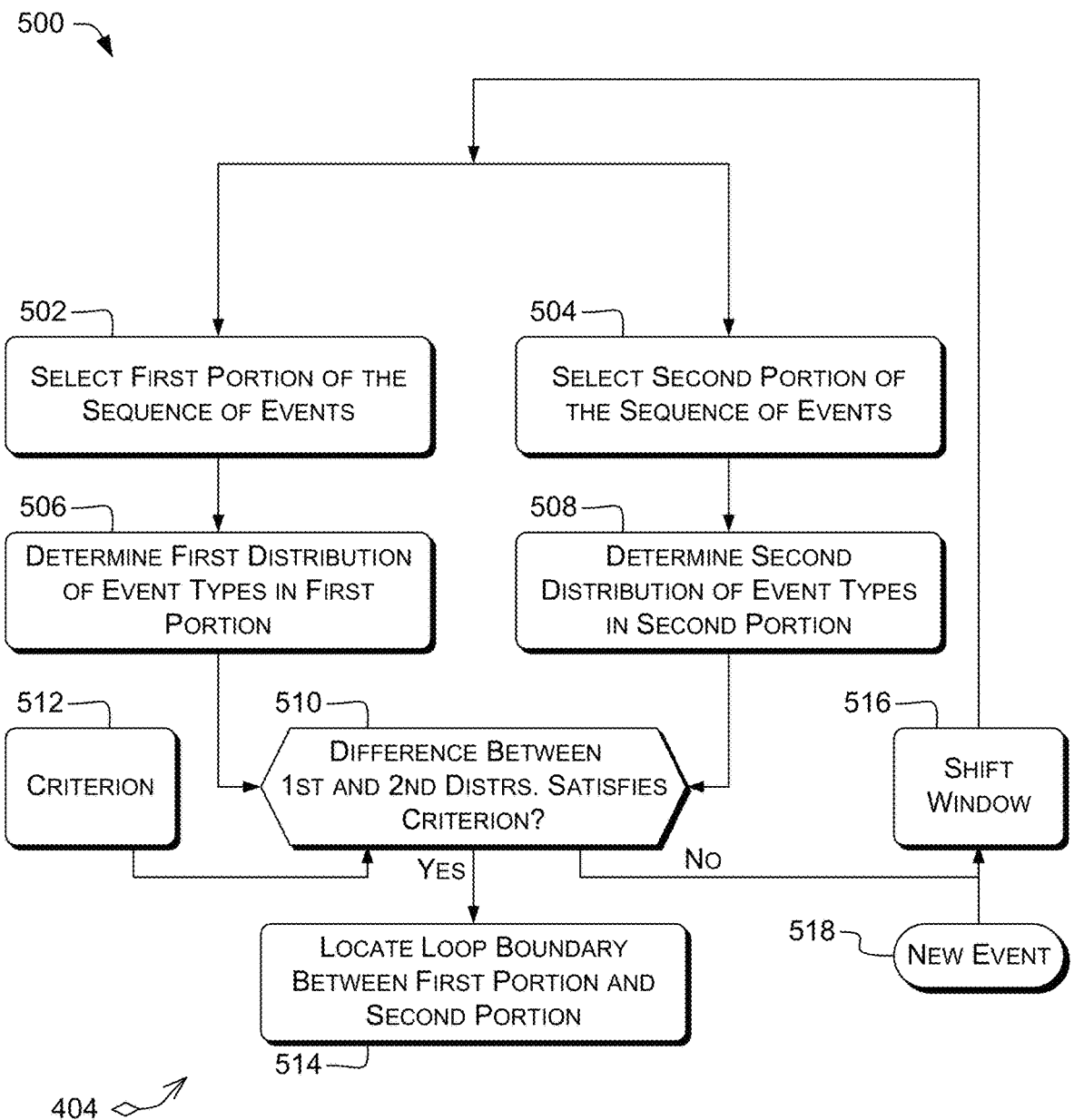
FIG. 5 illustrates an example process for locating a loop boundary.

FIG. 5 is a dataflow diagram that illustrates an example process 500 for detecting malware, and related data items. Operations of process 500 can be performed by at least one computing device 102, 104, or 106. In some examples, operation 404 can include operations 502, 504, 506, 508, and 510. In some examples, operation 404 can additionally or alternatively include at least one of operation 514 or operation 516.

In some examples, at operation 502, analyzing module 228 can select a first portion of the sequence of events. For example, the first portion can include a fixed-sized contiguous segment (a window) in the sequence of events.

In some examples, at operation 504, analyzing module 228 can select a second portion of the sequence of events, e.g., a window. In some examples, the first portion and the second portion comprise respective back-to-back fixed-size sliding windows. For example, in a 1024-event record, the first portion can include events 0-127 and the second portion can include events 128-255.

In some examples, at operation 506, analyzing module 228 can determine a first distribution of event types of the events within the first portion. For example, analyzing module 228 can determine a histogram of the event types by counting the events of each type in the window. For example, in a 128-event window with alternating reads (R) and writes (W), the histogram will have the two points R=64 and W=64.

In some examples, at operation 508, analyzing module 228 can determine a second distribution of event types of the events within the second portion. This can be done as discussed herein with reference to operation 506.

In some examples, at operation 510, analyzing module 228 can determine whether a difference between the first distribution and the second distribution satisfies a predetermined boundary criterion 512. If so, operation 510 can be followed by operation 514. If not, operation 510 can be followed by operation 516, or by operations 502 or 504. Criterion 512 can include a regular-expression test, substring test, numerical or range test, or other test or condition. For example, criterion 512 can determine whether the distributions differ in types of events included or numbers of events included (overall or of a particular type).

In some examples, criterion 512 can include a correlation or area overlap less than a predetermined value. For example, if the difference between the first distribution and the second distribution, as measured by correlation or area overlap, falls below, e.g., 25% or another value, operation 510 can determine that the criterion 512 has been satisfied. Correlation can be determined, e.g., per Pearson, Spearman, or Kendall.

In some examples, at operation 514, analyzing module 228 can, in response to the determination at operation 510, locating the boundary in the sequence of events between the first portion and the second portion. The use of "between" does not require that the first and second portions be spaced apart. In the example shown in FIG. 10, the boundary is located at the point where the end of the first region and the beginning of the second region coincide, and this is encompassed within the meaning of "between the first portion and the second portion" as used herein. In other examples in which the end of the first region precedes, and does not coincide with, the beginning of the second region, analyzing module 228 can locate the boundary at the end of the first region, at the beginning of the second region, or in between. In some of these examples, analyzing module 228 can locate the boundary at a midpoint of a gap between the first and second portions, or at a random point within that gap.

In some examples, at operation 516, analyzing module 228 can shift a sliding window. For example, if difference between events 0-127 and events 128-255 did not satisfy the criterion, analyzing module 228 can shift the window by one, so that the first portion is events 1-128 and the second portion is events 129-256. A shift by unity is not limiting; another nonzero value, positive or negative, can be used. Operation 516 can be followed by operations 502 or 504. This can permit processing a full trace of events, e.g., at runtime as those events become available, or after execution, to locate a window position at which the criterion is satisfied. In some examples, analyzing module 228 or a component providing events to analyzing module 228 can provide fewer than all of the events, e.g., a random or deterministic sampling thereof, in order to reduce the amount of data to be processed.

In some examples, operations 502-510 and 516 are performed at runtime as each event (or each n>1 events) is detected. Block 518 represents detection of a new event (or n events), and can be followed by block 516. At block 516, the windows can be shifted so that the event (or n events) are at the beginning of a window. Operations 502-510 can then be performed to determine whether or not the event indicates that a loop boundary has been reached.

While within the body of a loop, the distributions will generally be the same or similar regardless of position in the loop. However, the distributions for one loop, e.g., for file copy, and for another loop, e.g., for audio playback, will generally be different. Therefore, measuring the differences between distributions can permit determining when loops begin or end. An example is described herein with reference to FIG. 10.

The body of a loop may include conditionals, e.g., as discussed herein with reference to conditional 332, FIG. 3. These can cause variations in the distributions of event types across iterations of the loop. For example, body 330 of iterator 322, FIG. 3, can trigger one read event and one write event per iteration. Over the course of a large number of iterations, the read and write event counts will be equal if no frames were late. However, if any frames were late, conditional 332 will cause the write event count to be slightly less than the read event count. In some examples, criterion 512 is selected empirically, or includes a predetermined tolerance (e.g., ±5%, ±10%, or ±25%) so that the loop can still be detected even in the presence of variations due to conditionals 332.

In some examples, operation 514 is followed by operation 406 of determining distribution 314. In some of these examples, operation 406 includes determining the distribution 314 of event types 304 comprising information representing the occurrences of events 302 outside both the first portion and the second portion. For example, counts of occurrences of events of all types, or of all types with the n most-recently-occurring types, can be recorded during the loop. The counts can be reset at the beginning of a detected loop, although this is not required. The first and second portions, e.g., sliding windows, can permit determining the boundaries of loops. The counts can permit determining distribution 314 based on more complete data than will fit in the first or second portions. This permits using relatively smaller windows for the first and second portions, which speeds the process of locating loop boundaries, and also permits more accurately determining distributions 314 using more complete data of event counts during the loop.

Figure 6:
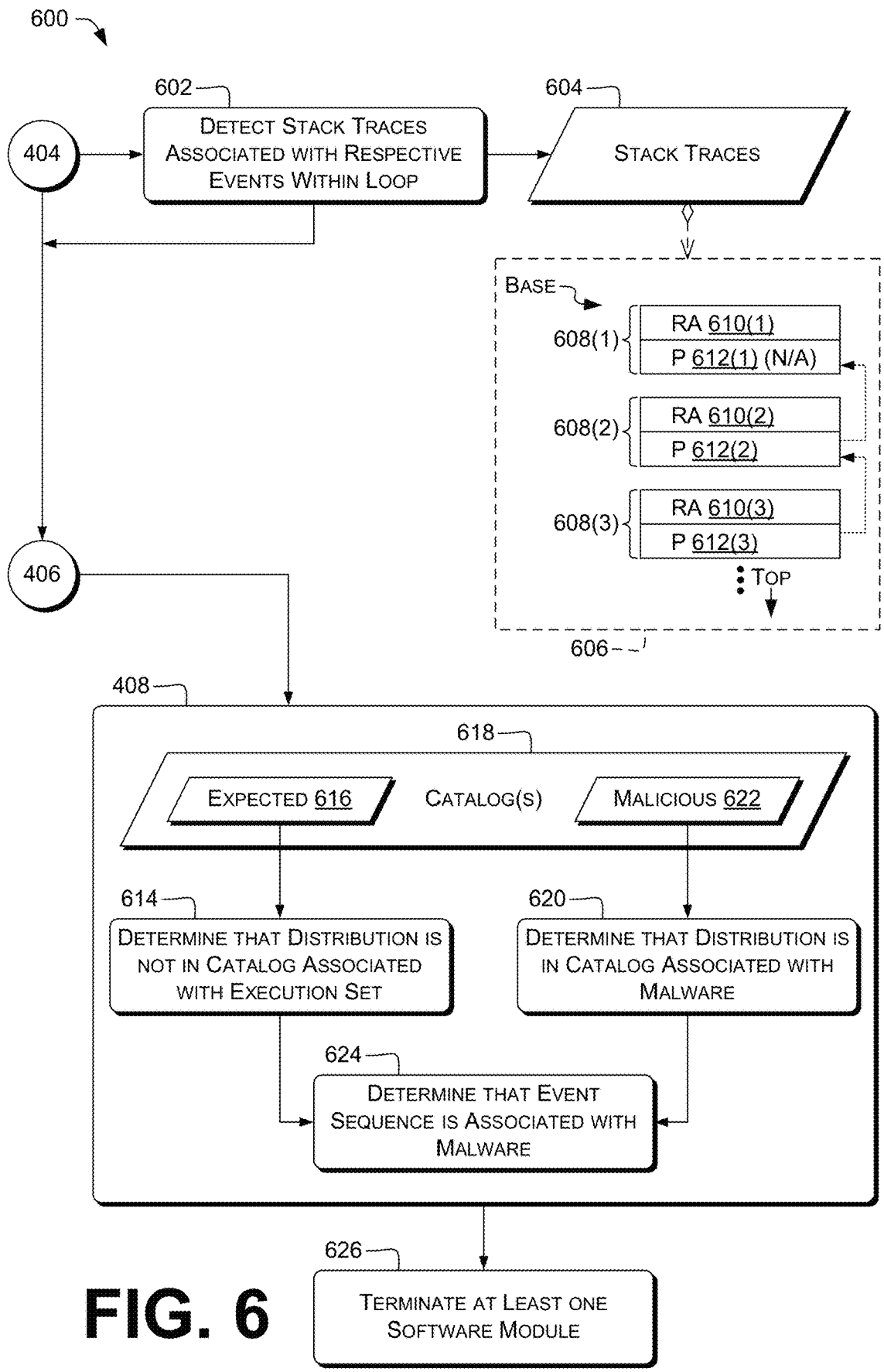
FIG. 6 illustrates example processes for collecting stack traces, determining that loops are associated with malware, and mitigating the effects of malware, and also shows an example stack trace.

FIG. 6 is a dataflow diagram that illustrates an example process 600 for detecting malware, and related data items. Operations of process 600 can be performed by at least one computing device 102, 104, or 106. In some examples, operation 402 can be followed by operation 602. In some examples, operation 408 can include operations 614, 620, and 624. In some examples, operation 408 can be followed by operation 626. Some examples omit operation 602, or omit operations 614, 620, and 624, or omit operation 626, or any combination of those. Specifically with respect to process 600, some examples use only operation 602; some examples use only operations 614, 620, and 624; some examples use only operation 626; and some examples use operations from at least two of these groups.

In some examples, at operation 602, the detection module 226 (or the analyzing module 228, and likewise throughout this document) can detect, at the monitored computing device, a plurality of stack traces 604 associated with respective events of the events 302 within the loop 310. Uses of stack traces 604 are discussed in more detail below with reference to FIGS. 7-10.

FIG. 6 also shows an example stack trace 606, which can be one of the stack traces 604. Trace 606 is shown growing downward in accordance with the x86 convention, but this is not limiting. As functions call other functions, activation records 608(1)-608(3) are pushed on the stack at successively lower addresses. Therefore, the logical top of the stack is shown below the logical base of the stack in FIG. 6. For brevity, only three activation records 608 are shown. However, the stack trace 606 can include any number of activation records 608. Each activation record 608 includes a return address 610(1)-610(3), which indicates where execution should resume once after the corresponding function completes. Each activation record 608 also includes a pointer 612(1)-612(3) to the previous activation record 608. Pointer 612(1) is marked as not applicable because, in this example, there is no activation record deeper on the stack than activation record 608(1) (e.g., for init(1) on a UNIX system).

In the illustrated example, activation record 608(2) represents a call by a first function to a second function. While executing, the second function can use the stack to store temporaries or other data. When the second function completes, execution will resume at return address 610(2), and the pointer 612(2) will be used to adjust the processor's state for execution in the first function. For example, on x86, the value of register BP can be restored from pointer 612(2).

In some examples, the detection module 226 can interrupt execution or otherwise gain control or execute when an event 302 is detected, e.g., by hooking an interrupt associated with that event. Detection module 226 can then determine the value of the IAR and stack-frame pointer (e.g., on x86, BP or EBP) at the time of the interrupt. The IAR is also known as an instruction pointer or program counter. Detection module 226 can then walk the stack in memory, beginning from the stack-frame pointer, to determine a stack trace 604. Walking the stack can include repeatedly retrieving the address of an activation record 608 (e.g., initially BP; subsequently, each successive pointer 612(1), as i decreases towards the base of the stack) and retrieving the return address 610 from that activation record 608. Detection module 226 can additionally or alternatively collect information different from the return addresses 610, e.g., values of function parameters or local variables that are found on the stack, or data residing at addressed pointed to by the stack. For example, the activation record for a call to the VISUAL STUDIO C runtime (MSVCRT) _execv function includes pointers to the command to be executed and to its arguments. Detection module 226, upon encountering such a call while walking the stack, can retrieve from memory the command or arguments at the addresses indicated on the stack, and incorporate those data in, or save those data in association with, a corresponding stack trace 604.

While walking the stack, detection module 226 can visit each activation record 608 in sequence, e.g., following the stippled arrows shown, and collect the return addresses 610 in trace 606. Detection module 226 can then map the return addresses 610 to functions or modules, e.g., using debugging symbols, map files, or other compilation or link-time outputs, or memory-region information from the operating system. For example, the WINDOWS VirtualQuery function provides MEMORY_BASIC_INFORMATION including an AllocationBase address. The corresponding module can be located by providing the AllocationBase as the module handle to the GetModuleFileName function. Alternatively, on UNIX-like systems supporting the /proc filesystem, the memory addresses used by a particular process can be found in /proc/<pid>/maps, where "<pid>" is the proc ID of the proc. The maps for each proc running on the system can be tested to determine which proc they includes a return address 610 of interest. Examples of using modules identified through a stack walk are discussed below with reference to FIGS. 7-9.

Still referring to FIG. 6, in some examples, techniques herein can locate malware based on behaviors of executables or other modules, as expressed by distributions 314. Examples are described herein with reference to operations 614, 620, and 624.

In some examples, at operation 614, analyzing module 228 can determine that the distribution 314 of event types within the loop 310 is not found in a catalog 616 of distributions associated with that loop 310 or with an execution set that produces that loop 310 (e.g., a particular executable). Catalog 616 can be an element of a set 618 of one or more catalogs. For example, the catalog 616 or set 618 can be stored on CRM 214. Catalog(s) 616 can be determined empirically, by running a program or other execution set many times, and collecting histograms as discussed herein with reference to operations 404 and 406. Those histogram(s), or averages, weighted averages, or other summaries or consolidated versions thereof, e.g., for different workloads, can be collected and stored in catalog 616.

For example, a word-processing program can have a typical behavior including frequent file writes, less-frequent file renames and deletions, and still less-frequent file reads.

This corresponds with a workload in which a file is opened and read into memory once. Then, to save changes throughout a user's editing session, a copy of the file is written, the original file is removed, and the copy is renamed to the same name as the original file. Additionally, backup files or autosave files may be written independently of renames or deletions An entry in catalog 616 for the word-processing program can reflect the relative event-type frequencies write>(rename≈delete)>>read.

In some examples, at operation 620, analyzing module 228 can determine that the distribution of event types within the loop is found in a catalog 622 of distributions associated with malware. Catalog 622 can be one of the elements of set 618. For example, a distribution 314 including large numbers of file reads, file writes, and calls to cryptographic primitives, together with a lesser number of file deletions, may indicate the presence of ransomware. Elements of catalog 622 can be collected empirically, e.g., by collecting data as discussed herein with reference to operations 402-406 during sandboxed detonation of malware samples. Catalog 622 can include distributions 314 specific to particular malware, e.g., CryptoLocker; to particular families of malware, e.g., ransomware or trojans, or to other known-malicious behavior.

In some examples, at operation 624, in response to the determinations at operation 614 or operation 620, analyzing module 228 can determine that the sequence of events, or the execution set or other iterator that produced it, is associated with malware. Mitigation or remediation actions can then be taken as described herein. In some examples, operation 624 is followed by operation 626.

In some examples, operation 614 or 620 can use various comparison techniques, against various formats of data in catalog set 618. In some examples, as discussed herein, the distribution for a loop can include the overall counts of each type of event for that loop. In some examples, the counts can be normalized or otherwise scaled to be independent of the number of iterations in any particular detected loop. Using overall counts can reduce the effects of variations of execution path within a loop, by averaging over those variations.

In some examples, analyzing module 228 can determine the distribution for a loop as a spectrogram of the event counts determined while sliding windows across that loop. A spectrogram can include data of event count indexed by both event type and window position (or other timebase). Consequently, the spectrogram can be, or can be represented as, an image with axes for event type and window position, and with each pixel value being or representing the corresponding event count (e.g., raw or normalized). Image-similarity algorithms can then be used to compare the spectrogram of a loop with spectrogram(s) in the catalog. For example, the catalog can include morphological or other image characteristics of a spectrogram image.

In some examples, catalogs in set 618 can be constructed by observing multiple runs of a particular execution set. For example, script interpreters such as PowerShell generally behave, on startup, in a way that is independent of the script being executed. When the interpreter begins execution of the script, its behavior (as observed in the detected events) can change. To determine the portion of the behavior that is characteristic of the interpreter, as opposed to the script, spectrograms can be collected while running multiple scripts. Respective portions of those spectrograms that substantially correspond to each other can be determined, and one of (or an average or other aggregate representation of) those portions can be stored in a catalog. This can permit determining that non-script-specific interpreter behavior is not malicious, in some examples.

Using operations 614 or 620 can permit identifying malware event when that malware is obfuscated, attempts to disguise itself using rundll32 or another invoker, hooks the operating system to prevent its files from being scanned by antivirus software, or otherwise hides from security software or researchers. Loop detecting and event-type profiling permit analyzing the behavior of a computing system, without requiring advance knowledge of the specific software module(s) responsible for that behavior. Malware cannot simultaneously perform malicious behavior and hide that behavior from the operating-system or other components it relies upon to carry out that behavior. Therefore, monitoring those components and detecting loops can permit detecting malware that might otherwise be hidden.

In some examples, at operation 626, mitigation module 230 can, in response to the determination at operation 408 that the sequence of events is associated with malware, terminate at least one software module associated with the sequence of events, e.g., at least one member of an execution set associated with the sequence of events. Additionally or alternatively, mitigation module 230 can take another mitigation or remediation action, e.g., quarantining or reporting to a security service. Examples are discussed herein, e.g., with reference to FIG. 9.

In some examples of operations 614 and 620, distribution 314 includes a histogram or another measure of relative frequencies or counts of occurrences of various event types 304. In some of these examples, distribution 314 can be located in a catalog in set 618 using proximity-search techniques for vectors. For example, a distribution 314 including respective values (e.g., counts) for n event types 304 can be treated as an n-element vector. A catalog can include, e.g., n-element vectors representing distributions in the catalog. Analyzing module 228 can determine that distribution 314 is found in the catalog if distribution 314 is within a certain distance of, or within a predetermined neighborhood of, any point in the catalog. This can be determined, e.g., using a spatial-subdivision tree, k-d tree, or other spatial-indexing or -search structure, e.g., an octree for n=3. The n-element vector can be used to query the structure to determine whether any known distributions are within an octree cell, which can be considered the neighborhood of catalog points in that octree cell. Additionally or alternatively, a catalog can include or be associated with a locality-sensitive hashing (LSH) algorithm, and distribution 314 can be found in the catalog if it hashes to an LSH bin that also includes at least one point in the catalog.

Figure 7:
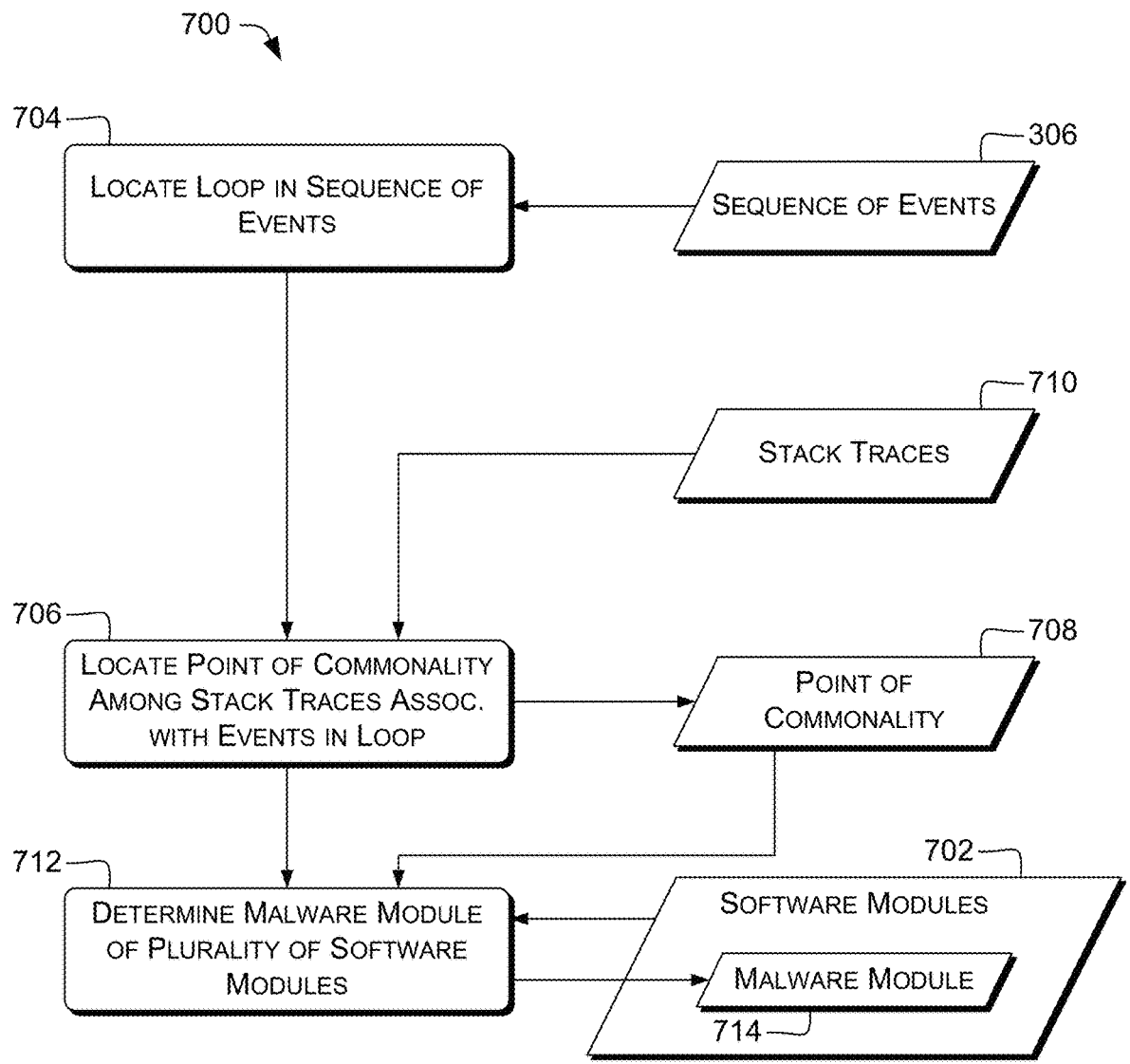
FIG. 7 illustrates an example process for determining a malware module of a plurality of software modules.

FIG. 7 is a dataflow diagram that illustrates an example process 700 for locating malware, and related data items. Operations of process 700 can be performed by at least one computing device 102, 104, or 106. In some examples, process 700 is carried out by processing unit 210 of a monitored computing device, e.g., computing device 104 (referred to throughout for brevity) or other computing devices, e.g., a processing unit 210 in cluster 108. Process 700 can include locating a malware module among a plurality of software modules 702 executed on the monitored computing device.

Some malicious code is packaged in its own executable. However, other malicious code is packaged in a module that will be executed by a separate executable. For example, a malware module might be packaged as a DLL executed by rundll32.exe. The rundll32.exe program is a system component, so is not itself malicious. As a result, some prior proc-based malware detection schemes might fail to detect infections of rundll32.exe. Other prior proc-based schemes might erroneously detect rundll32.exe itself as malicious. In contrast, process 700 permits locating the actual malware DLL, even when operating in a rundll32 proc.

In some examples, at operation 704, processing unit 210 can locate a loop 310 within a sequence 306 of events 302 detected at the monitored computing device 104. The loop can be located based at least in part on relative frequencies of the event types 304. Examples are discussed herein, e.g., with reference to FIGS. 4 and 5. Each event 302 of the sequence 306 of events has a respective event type 304.

In some examples, multiple modules of the software modules 702 participate in the sequence 306 of events 302. Accordingly, sequence 306 can include a first event associated with a first software module of the plurality of software modules 702 executed on the monitored computing device, and a second event associated with a second, different software module of the plurality of software modules 702 executed on the monitored computing device. As noted above, the sequence 306 can be a sequence that was collected during detonation or other postmortem analysis. Additionally or alternatively, sequence 306 can be a sequence of events captured and processed substantially in real time, e.g., by a security agent running on the monitored computing device.

In some examples, at operation 706, processing unit 210 can locate a point of commonality 708 among a plurality of stack traces 710 associated with respective events within the loop. Stack traces 710 can represent stack traces 604, in some examples. A detailed example is described herein with reference to FIG. 10. In some examples, the point of commonality 708 can be a point at or before which (e.g., immediately before which) which control flow diverges between two stack traces 710. In some examples, operation 706 can include disregarding common operating-system routines at or near the top of the stack, or other whitelisted or known-good routines.

Still referring to FIG. 7, and also referring back to FIG. 3, in some examples, body 330 of iterator 322 can execute in a first module. The read routine can be in a second module, and the write routine can be in a third module. A stack trace associated with a read event will include activation records 608 in the first module, followed by activation records 608 in the second module. Similarly, a stack trace associated with a write event will include activation records 608 in the first module, followed by activation records 608 in the third module. The processing unit 210 can determine the point of commonality 708 as the activation record 608 closest to the top of the stack that is found in both the read-event trace and the write-event trace. This activation record 608 will be in the first module.

In some examples, at operation 712, processing unit 210 can determine a malware module 714 of the plurality of software modules 702, wherein the malware module comprises the point of commonality 708. For example, processing unit 210 can determine the malware module 714 based on a memory address of the point of commonality 708 in a code segment, e.g., as discussed herein with reference to stack trace 606 (e.g., using the VirtualQuery function on WINDOWS). Continuing the above example of iterator 322, and supposing that iterator 322 is included in the malware module 714, the point of commonality 708 being an activation record 608 in the first module would indicate that the first module was the malware module 714. Accordingly, malware module 714 can be identified based on observed behavior of the malware module 714, even if the malware module attempts to disguise itself using rundll32 or another invoker, e.g., as discussed above with reference to operation 624.

Figure 8:
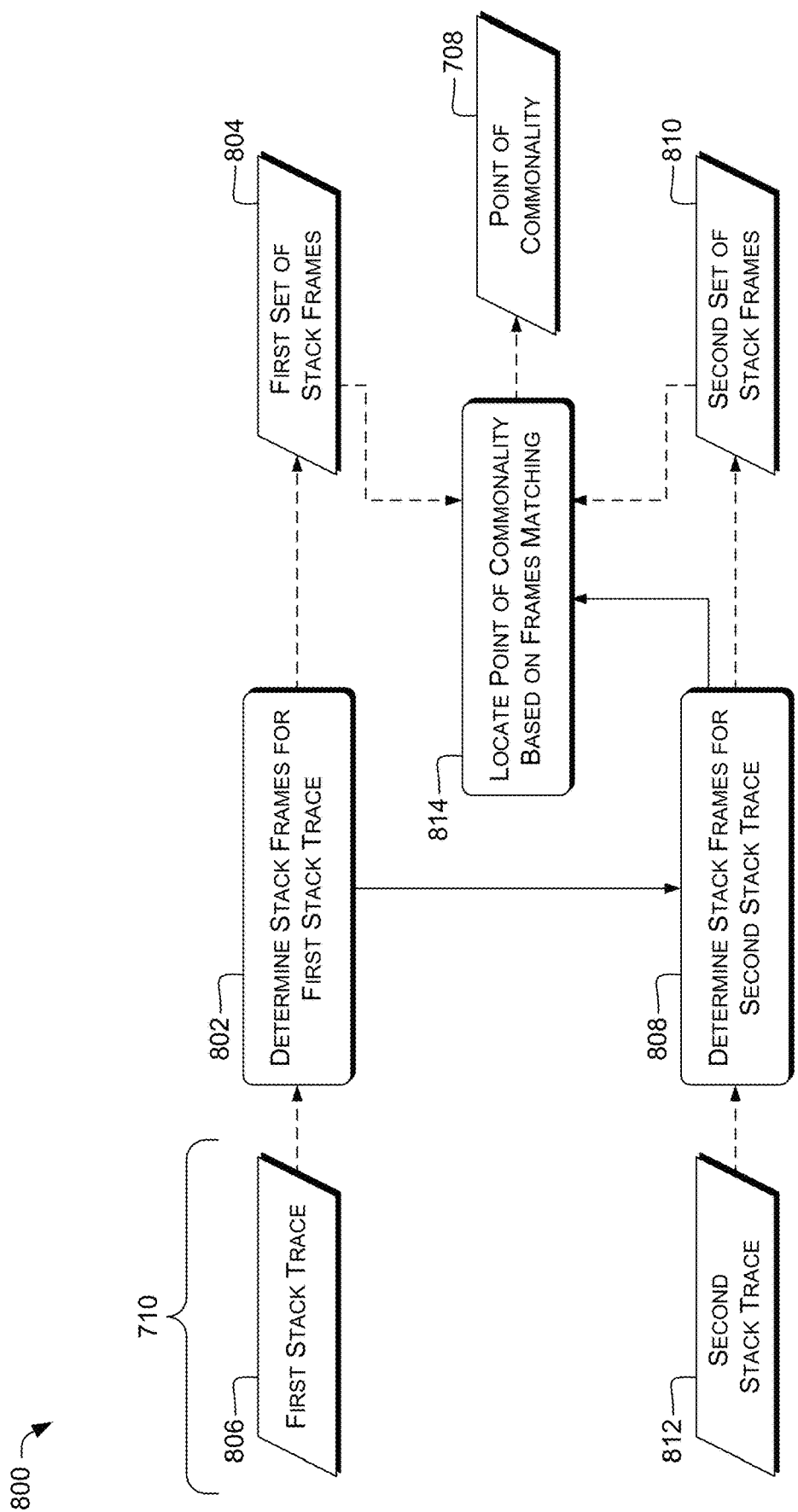
FIG. 8 illustrates an example process for determining a point of commonality between two stack traces.

FIG. 8 is a dataflow diagram that illustrates an example process 800 for locating malware, and related data items. Operations of process 800 can be performed by at least one computing device 102, 104, or 106. In some examples, process 800 is carried out by processing unit 210 of a monitored computing device or a processing unit 210 in cluster 108. In some examples, operation 706 can include operations 802, 808, and 814. For clarity, dataflows are shown dashed in FIG. 8.

FIG. 8 shows two stack traces, but this is not limiting; operations herein can additionally or alternatively be used to identify a point of commonality 708 between more than two stack traces. For example, points of commonality 708 can be identified by pairwise comparison, or by sorting stack traces in one pass and comparing them in a second pass.

In some examples, at operation 802, processing unit 210 can determine a first set 804 of stack frames for a first stack trace 806 of the plurality of stack traces 710. Examples are discussed herein, e.g., with reference to detection module 226 and stack trace 606. For example, each stack frame can include at least one of: an activation record; a saved register; a local variable; or a pointer to data not included in the stack.

In some examples, at operation 808, processing unit 210 can determine a second set 810 of stack frames for a second, different stack trace 812 of the plurality of stack traces 710. Examples are discussed herein, e.g., with reference to operation 802. In some examples, the first stack trace 806 is associated with a respective event having a first event type, and the second stack trace 812 is associated with a respective event having the first event type. This can permit testing traces associated with events of the same type. In other examples, the respective events associated with the first stack trace 806 and the second stack trace 812 have respective, different event types.

In some examples, at operation 814, processing unit 210 can locate, as the point of commonality 708, a first stack frame of the first set of stack frames. The first stack frame and the stack frames preceding it (e.g., closer to the based of the stack) in the first set of stack frames 804 can match corresponding stack frames in the second set of stack frames 810. A second stack frame following the first stack frame in the first set of stack frames 804 can differ from a corresponding stack frame in the second set of stack frames 810. The second stack frame can immediately follow the first stack frame, or there can be at least one stack frame between the first stack frame and the second stack frame.

The correspondence between the first stack frame in the first set of stack frames 804 and the corresponding frames in the second set of stack frames 810 can be at least a predetermined number of stack frames long, e.g., unity, or a number greater than unity. In some examples, the correspondence can extend to the bases of the stack traces 806, 812. Correspondence can be determined, e.g., by matching return addresses 610, pointers 612, module names, handles, or identifiers, or other fields associated with the stack frames in the sets 804, 810. In some examples, the second stack frame is in the same module as a topmost stack frame occurring in the same module in both the first set of stack frames 804 and the second set of stack frames 810. Examples are discussed herein, e.g., with reference to FIG. 10.

Operation 814 can include locating the point of commonality 708, e.g., using search algorithms such as KMP operating over textual representations of the stack traces 806, 812; using longest-common-sub string or longest-commonsubsequence algorithms such as Black's algorithm, suffix-tree generation, dynamic programming, the Myers diff algorithm, or other algorithms listed for longest common substring or longest common subsequence in the NIST Dictionary of Algorithms and Data Structures or the Stony Brook Algorithm Repository. In some examples, the point of commonality 708 is the stack frame at the end of the longest common subsequence closest to the top of the stack, or another stack frame in the same module as that stack frame. Additionally or alternatively, the point of commonality 708 can be located by walking the first stack trace 806 and the second stack trace 812 in parallel, beginning with the base of the stack or a predetermined common point, until the stack traces 806, 812 diverge, and determining that the point of commonality 708 is the stack frame immediately preceding the divergence, or another stack frame in the same module as that stack frame. The predetermined common point can include, e.g., a process or thread associated with a well-known parent routine (e.g., an init(1) process on a UNIX system).

Figure 9:
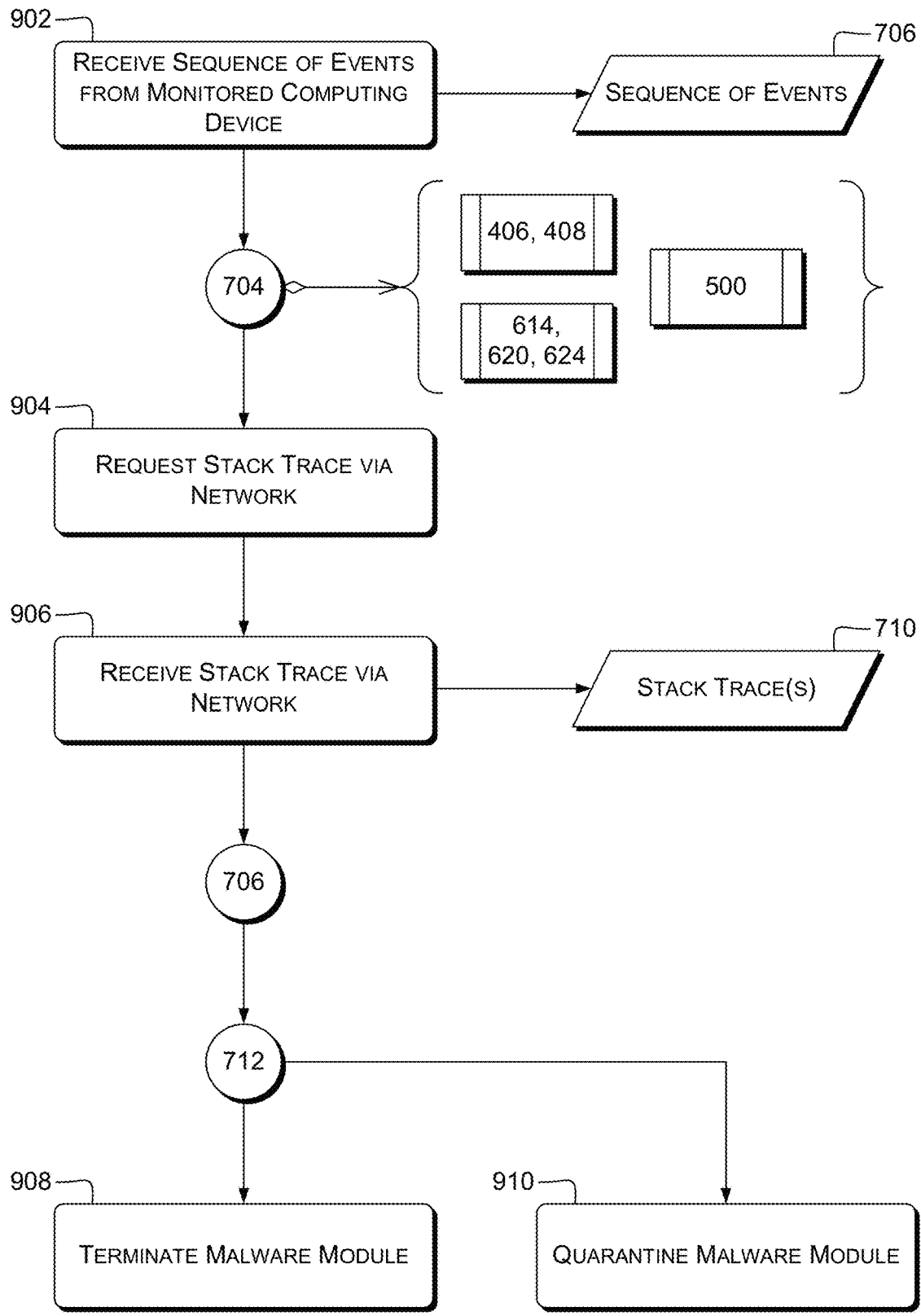
FIG. 9 illustrates example processes for interactions between a security service and a monitored computing device and for mitigating the effects of malware.

FIG. 9 is a dataflow diagram that illustrates an example process 900 for locating malware, and related data items. Operations of process 900 can be performed by at least one computing device 102, 104, or 106. In some examples, process 900 is carried out by processing unit 210 of a monitored computing device or a processing unit 210 in cluster 108. Specifically with respect to process 900, in some examples, only one of the following groups of operations is used, or operations from at least two of the following groups are used: operation 902; operations 904 and 906; or operations 908 and 910.

In some examples, e.g., carried out at cluster 108, at operation 902, before locating the loop 310 (operation 704), the processing unit 210 can receive the sequence of events from the monitored computing device via a network 110. For example, a processing unit 210 in cluster 108 can receive event records 120 for processing. Operation 902 can be followed by operation 704, which can be followed by operation 904.

In some examples, operation 704 of finding a loop, or other operations, can be carried out as described above, e.g., with reference to operations 406 and 408; process 500; or operations 614, 620, and 624. For example, after operation 902, processing unit 210 can determine a distribution 314 of the event types 304 (operation 406) in the loop 310. Processing unit 210 can then determine that the loop 310 is associated with malware based on the distribution 314 (operation 408). Additionally or alternatively, processing unit 210 can determine respective portions of the sequence 306 of events (operations 502 and 504); determine respective distributions 314 of event types 304 of the events 302 in those portions (operations 506 and 508); determine that a difference between the distributions 314 satisfies a criterion 512 (operation 510); and, in response, locate a boundary of the loop 310 in the sequence 306 of events between the first and second portions (operation 514). Additionally or alternatively, processing unit 210 can determine that the distribution 314 of event types 304 of the events 302 in the loop 310 is not found in a catalog 616 of distributions associated with the loop 310 (operation 614), or that the distribution 314 is found in a catalog 622 of distributions associated with malware (operation 620). In response to either determination, processing unit 210 can determine that the loop 310 is associated with malware (operation 624).

In some examples, at operation 904, processing unit 210 can, after locating the loop 310, request, via the network, at least one stack trace of the plurality of stack traces 710. For example, processing unit 210 in cluster 108 can communicate via network 110 with a security agent running on monitored computing device 104.

In some examples, at operation 906, processing unit 210 can receive, via the network, the at least one stack trace. Operation 906 can be followed by operation 706 of locating the point of commonality 708. In some examples, operation 706 can be followed by operation 712 of finding the malware module 714 based on the stack traces 710. In some examples, operation 712 can be followed by operations 908 or 910.

In some examples, monitoring event types is much faster, and uses less memory per record, than capturing stack traces. Using operations 904 and 906 can permit retrieving stack traces 710 only for loops associated with malware, and not for other, benign loops running on the computing device 104. This can provide effective detection of malware at a reduced cost in system or network resources than some prior schemes.

In some examples, at operation 908, processing unit 210 (e.g., mitigation module 230) can terminate the malware module 714. For example, processing unit 210 can transmit a command via network 110 to a security agent at computing device 104 to cause the agent to terminate the malware module 714 or a proc (e.g., rundll32) hosting that malware module. Additionally or alternatively, a processing unit 210 in computing device 104 can directly terminate the malware module 714 or corresponding proc(s).

In some examples, at operation 910, processing unit 210 (e.g., mitigation module 230) can quarantine the malware module 714, e.g., directly, or by transmitting commands via network 110 to a security agent running on computing device 104. For example, quarantining can include removing network, filesystem, or other access from malware module 714 or corresponding proc(s), or marking malware module 714 as non-executable or non-readable.

Figure 10:
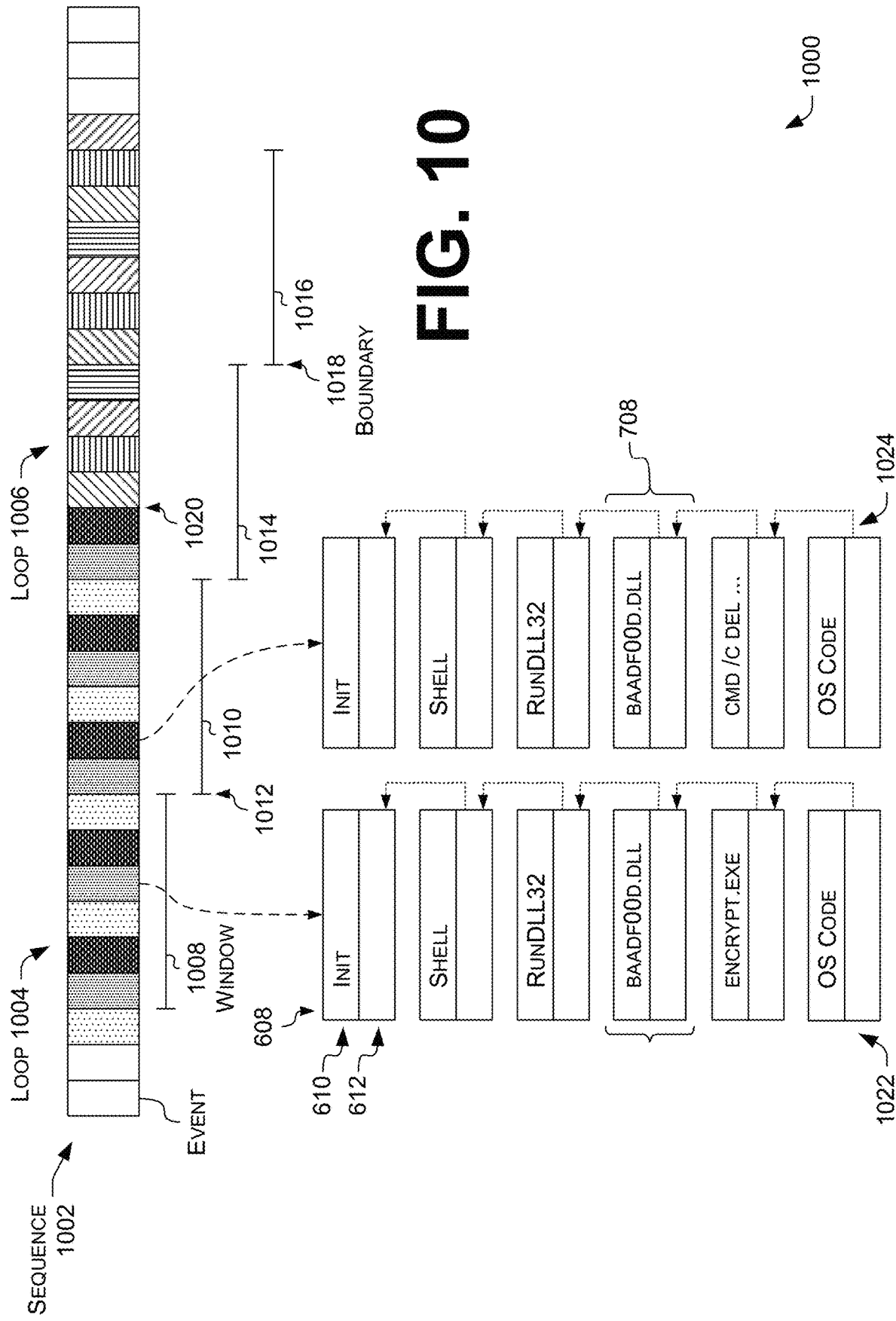
FIG. 10 illustrates example loops, an example sequence of events, and example stack traces.

FIG. 10 depicts a nonlimiting example 1000 of event sequences 306, distributions 314, and stack traces 604, 710. Event sequence 1002, which can represent event sequence 306, is depicted using blocks, one per event (for clarity, only one block is labeled). The hatching pattern of each block represents the type of the event represented by that block. In general terms, event sequence 1002 includes two loops: a first loop 1004 depicted using a pattern of light-to-dark hatching, and a second loop 1006 depicted using a pattern of rotating-angle hatching.

In an example, portions 1008 and 1010 are back-to-back sliding windows. The distribution 314 of events 302 in portion 1008 is the same as the distribution 314 of events 302 in portion 1010: two light-hatched, two medium-hatched, and two dark-hatched. Therefore, the difference between those distributions 314 does not satisfy criterion 512. Consequently, processing unit 210 can determine that position 1012, between portion 1008 and portion 1010, is not a boundary of a loop. In the illustrated examples, the loops 1004 and 1006 are larger than the sizes of portions 1008 and 1010 (window sizes). Additionally or alternatively, in some examples, a loop can be the same size as a portion, or smaller than a portion.

Continuing the illustrated example, suppose the windows are moved a full window's width of six events 302. Portion 1014 and portion 1016 are the resulting portions. The distributions 314 of event types in portions 1014 and 1016 differ, as shown in Table 1. Consequently, processing unit 210 can determine that difference between those distributions 314 satisfies criterion 512, and therefore that position 1018, between portion 1014 and portion 1016, is a boundary of a loop.

TABLE 1

| Event hatching | Portion 1014 | Portion 1016 |
|---|---|---|
| Light | 0 | 0 |
| Medium | 1 | 0 |
| Dark | 1 | 0 |
| ascending | 1 | 2 |
| horizontal | 1 | 2 |
| descending | 1 | 1 |
| vertical | 1 | 1 |

From visual inspection of FIG. 10, it might appear that position 1020, between loop 1004 and 1006, is a more accurate boundary of a loop than position 1018. However, in many malware samples, the number of events per loop iteration is much more than three events per iteration (as in loop 1004) or four events per iteration (as in loop 1006). In these situations, selecting a boundary a small number of iterations away from an actual boundary, such as might be determined through disassembly, may slightly increase noise in the measurements, but will not defeat the analysis performed by the analyzing module 228. For example, a change of two event types in a histogram of more than 100 events can be negligible.

FIG. 10 also shows two example stack traces 1022, 1024, e.g., determined as discussed herein with reference to operation 602. For brevity, not all elements are labeled. Each stack trace 1022, 1024 includes multiple activation records 608, each depicted as including a return address 610 and a pointer 612. The return addresses 610 are given as names of representative modules containing those return addresses, for ease of explanation. The illustrated nonlimiting example is for a hypothetical ransomware sample.

Stack trace 1022 is associated with an event in loop 1004, as indicated by the dashed arrow. Stack trace 1022 includes five activation records 608. From the base of the stack (above) to the top of the stack (below), those are a system-startup routine ("init"), a shell, rundll32, "baadf00d.dll" (the hypothetical malware), and "encrypt.exe", a hypothetical benign encryption program. In this example, encrypt.exe is unrelated to the malware, but is used by the malware to encrypt files. Therefore, prior schemes that attribute background encryption of files to encrypt.exe would fail to locate the actual malware.

Stack trace 1024 is also associated with an event in loop 1004. Stack trace 1024 is associated with an event 302 of a different event type 304 than is event 302, although this is not limiting. Stack trace 1024 also includes init, shell, rundll32, and the malware ("baadf00d.dll"). However, instead of encrypt.exe, stack trace 1024 includes the invocation "cmd/c del . . . ", which deletes a file (on Windows, the "del" command is implemented within cmd.exe rather than as a separate executable). Some prior schemes that only consider the top of the stack would fail to associate the encrypt call and the del call with the same malware module.

In some examples, operation 706 or process 800 can be applied to stack traces 1022 and 1024 to determine a point of commonality 708. In this example, point of commonality 708 is the stack frame illustrated as being part of baadf00d.dll. Operation 712 can be applied to that stack frame to determine that malware module 714 is baadf00d.dll. In this example, techniques herein permit locating malware module 714 by detecting a loop and correlating stack traces within that loop. Mitigation or remediation can then be performed, e.g., as discussed herein with reference to operations 626, 908, or 910. This can permit effectively detecting and mitigating the effects of malware or remediating activity thereof.

As noted above, this example includes disregarding the OS file-access routine ("OS code") at the top of the stack when determining the point of commonality. This permits locating malware in OSes in which the routine at the top of the stack at the time of event detection may always be one of a small number of routines (e.g., for UNIX, one of: open(2), close(2), read(2), write(2), or ioctl(2)).

In some examples, the point of commonality 708 can be located in any of the illustrated common modules, in the depicted example baadf00d.dll, RunDLL32, Shell, and Init. This set of common modules can be referred to as a region of commonality. In some examples, the point of commonality 708 is the common point closest to the top of the stack ("topmost common point," for brevity) (baadf00d.dll in FIG. 10). In other examples, a different point of commonality can be selected. For example, malware module 714 might provide data that caused another process to serve as the topmost common point. An example is a script interpreter, in which the main dispatch function of the interpreter might serve as the topmost common point regardless of what script instructions were run. In such an example, the malware module might be closer to the base of the stack than the topmost common point, and might invoke the interpreter's dispatch function. In some examples, therefore, the point of commonality can be selected by finding the topmost common point, then moving towards the base of the stack until a module is located that is not known good or whitelisted.

In some examples, as discussed herein with reference to FIG. 6, the return addresses 602 in the stack traces 1022, 1024 can provide information about the location or extent of an iterator in a code module. For example, after locating loop 1004 (e.g., operation 404 or 704), the analyzing module 228 can collect return values 610 referencing code locations within the malware module 714 containing the point of commonality 708. Analyzing module 228 can then determine a range including those return values 610, e.g., the tightest range that includes all such return values 610, or the 95% (or another percentage) most common such return values 610, or a range determined in any of those ways, expanded at the beginning to the nearest branch target or extended at the end to the next call, jump, or other branch instruction.

This analysis can also be performed at runtime. As discussed herein with reference to block 518, loop boundaries can be located at runtime, as events are detected. In some examples, when a loop boundary is detected, the frequency of stack tracing can be increased, to capture information about the loop.

In some examples, operation 510 provides a confidence value (e.g., correlation or area overlap) in addition to the indication of whether the difference satisfies criterion 512. In some of these examples, the frequency of stack-trace collection can be negatively correlated with confidence (fewer traces collected in high-confidence regions; more traces collected in low-confidence regions). The higher number of stack traces collected in lower-confidence regions can be used to find iterator(s), e.g., using operations 704 and 706. Then, in some examples, loop boundaries can be determined based on whether or not the stack traces of particular events pass through the located iterator. This can permit processes 400-800, or elements thereof, to be used together to more effectively locate loops, iterators driving those loops, and malware modules.

Figure 11:
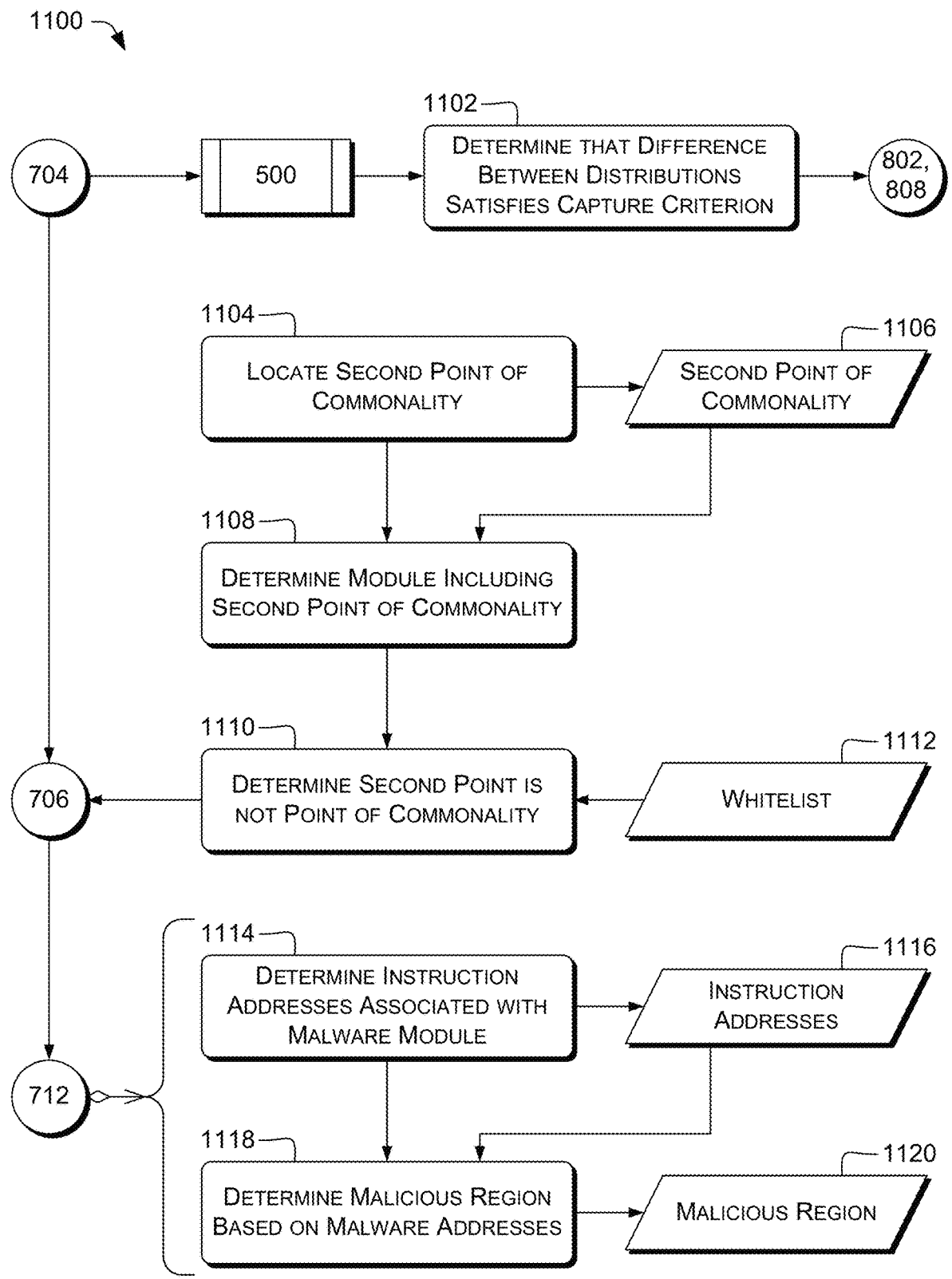
FIG. 11 illustrates example processes for locating or analyzing malware.

FIG. 11 is a dataflow diagram that illustrates example processes 1100 for locating or analyzing malware, and related data items. Operations of processes 1100 can be performed by at least one computing device 102, 104, or 106. In some examples, operation 704 can be followed by blocks 502-508 or other portions of process 500, e.g., as discussed herein with reference to FIG. 9, and process 500 can be followed by block 1102. In some examples, operations 1104, 1108, and 1110 can be performed before, after, or as part of operation 706. In some examples, operation 712 can include or be followed by operations 1114 and 1118.

In some examples, at operation 1102, processing unit 210 can determine that the difference between the first distribution and the second distribution satisfies a predetermined capture condition. For example, the capture condition can include any of the following: that the difference exceeds a predetermined value; or that the difference is within an intermediate range between a predetermined new-loop level and a predetermined same-loop level. In response, processing unit 210 can perform blocks 802 and 808 to capture or otherwise determine a first set 804 of stack frames for a first stack trace 806 of the plurality of stack traces and a second set 810 of stack frames for a second, different stack trace 812 of the plurality of stack traces. Examples are discussed herein, e.g., with reference to FIGS. 8 and 10.

In some examples, at operation 1102, processing unit 210 can further determine that a stack trace should be captured based at least in part on factors such as the amount of time (or number of events, or interval in another timebase) since the last stack trace. As discussed herein with reference to FIG. 10, stack traces can be more frequent when confidence is lower. Therefore, the length of the interval can be proportional to the confidence. This can permit maintaining confidence in loop boundary detection without consuming storage or computational resources to perform unnecessary stack traces.

In some examples, at operation 1104, processing unit 210 can locate a second point of commonality 1106 closer to respective stack tops of the plurality of stack traces (e.g., traces 1022, 1024) than is the point of commonality 708. This can be done, e.g., as described herein with reference to operation 706. In the example of FIG. 10, the "OS Code" block can be the second point of commonality 1106.

In some examples, at operation 1108, processing unit 210 can determine a module of the plurality of software modules, wherein the module comprises the second point of commonality 1106. This can be done, e.g., as discussed herein with reference to operation 712.

In some examples, at operation 1110, processing unit 210 can determine that the second point of commonality 1106 is not the point of commonality 708 based at least in part on the module being listed in a whitelist 1112. The whitelist 1112 can be, e.g., a lookup table indexed by module hash, image filename, or another identifier of the module. In some examples, operation 1110 is followed by operation 706 of locating the point of commonality 708, e.g., farther from the top of the stack than the second point of commonality 1106.

In some examples, operations 1104-1108 can reduce noise and increase accuracy in locating malware modules. These operations can reduce the probability of incorrectly identifying points of commonality in multi-function OS subsystems such as the I/O system. For example, each file operation might pass through an IRP dispatcher in a filesystem driver, but this commonality would not of itself imply that the filesystem driver was malicious. Using operations 1104-1108 can permit continuing the search for a point of commonality (operation 706) towards the base of the stack to locate the malicious module. In some examples, operations 1104-1108 can be used to search from the base of the stack towards the top of the stack.

In some examples, at operation 1114, processing unit 210 can determine, based at least in part on at least two stack traces of the plurality of stack traces, a plurality of instruction addresses 1116 (or at least one instruction address 1116), e.g., return addresses or instruction address register (TAR) values, associated with the malware module 714. For example, the instruction addresses 1116 can include addresses within an iterator that produces a detected loop, that iterator being within the malware module 714. Operation 1114 can include statistically sampling addresses detected within the loop; selecting addresses on a pattern (e.g., every nth, n>1); or selecting addresses randomly within the loop.

In some examples, at operation 1118, processing unit 210 can determine a malicious region 1120 of the malware module 714 based at least in part on the plurality of instruction addresses 1116. Operation 1118 can include determining the malicious region 1120 as a region including all, substantially all, or 95% (or another predetermined percentage) of the instruction addresses 1116. Operation 1118 can additionally or alternatively include locating the boundaries of an iterator including the instruction addresses 1116 or a subset thereof, e.g., by finding branch targets preceding the instruction addresses 1116 or the subset thereof, or branch instructions following the instruction addresses 1116 or the subset thereof. If debug symbols for the malicious module are available, operation 1118 can include locating, in the debug symbols, the function(s) containing the instruction addresses 1116 or the subset thereof. The malicious region 1120 can then be the located function(s) or a subset thereof.

Various examples using operations 1116 and 1118 provide finer-grained analysis of malware. For example, malware module 714 may include library code provided by parties other than the malware author. Such library code can include, e.g., standard libraries; C++ template libraries; or statically-linked modules used by both malicious and non-malicious code. Operations 1116 and 1118 permit excluding the non-malicious portions of malware module 714 from analysis, which can permit more effectively mitigating the effects of malware module 714. In some examples, the malicious region 1120 is used as a known-malicious training sample for a supervised learning process that trains a neural network to distinguish malicious code from non-malicious code.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method of determining that a sequence of events at a monitored computing device is associated with malware, the method comprising: detecting, at the monitored computing device, the sequence of the events, individual events having respective event types and taking place at the monitored computing device; locating a loop within the sequence of events based at least in part on relative frequencies of the event types; determining a distribution of event types of the events within the loop; and determining that the sequence of events is associated with malware based at least in part on the distribution of event types within the loop.

B: The method according to paragraph A, wherein events of the sequence of events are produced by at least one process or at least one thread.

C: The method according to paragraph A or B, wherein the loop is defined at least partly by a boundary, the method further comprising: selecting a first portion of the sequence of events; selecting a second portion of the sequence of events; determining a first distribution of event types of the events within the first portion; determining a second distribution of event types of the events within the second portion; determining that a difference between the first distribution and the second distribution satisfies a predetermined boundary criterion; and in response, locating the boundary in the sequence of events between the first portion and the second portion.

D: The method according to paragraph C, wherein the distribution of event types comprises information representing the occurrences of events outside both the first portion and the second portion.

E: The method according to paragraph C or D, wherein the first portion and the second portion comprise respective back-to-back fixed-size sliding windows.

F: The method according to any of paragraphs A-E, wherein the distribution of event types comprises a histogram of the event types of the events within the loop.

G: The method according to any of paragraphs A-F, wherein the respective event types are selected from the group consisting of: a system-call type, an Application Programming Interface (API)-call type, an input-output (I/O) request packet (IRP) type, or an inter-process communication (IPC)-message type.

H: The method according to any of paragraphs A-G, further comprising: determining that the distribution of event types within the loop is not found in a catalog of distributions associated with the sequence of events; and in response, determining that the sequence of events is associated with malware.

I: The method according to any of paragraphs A-H, further comprising: determining that the distribution of event types within the loop is found in a catalog of distributions associated with malware; and in response, determining that the sequence of events is associated with malware.

J: The method according to any of paragraphs A-I, further comprising detecting, at the monitored computing device, a plurality of stack traces associated with respective events of the events within the loop.

K: The method according to any of paragraphs A-J, further comprising, in response to determining that the sequence of events is associated with malware, terminating at least one software module ssociated with the sequence of events.

L: One or more computer storage media having thereon computer-executable instructions that, upon execution by a processing unit, cause the processing unit to perform operations for locating malware among a plurality of software modules executed on a monitored computing device, the operations comprising: locating a loop within a sequence of events detected at the monitored computing device based at least in part on relative frequencies of respective event types of the events, wherein the sequence of events comprises at least a first event associated with a first software module of the plurality of software modules executed on the monitored computing device and a second event associated with a second, different software module of the plurality of software modules executed on the monitored computing device; locating a point of commonality among a plurality of stack traces associated with respective events within the loop; and determining a malware module of the plurality of software modules, wherein the malware module comprises the point of commonality.

M: The one or more computer storage media according to paragraph L, the operations further comprising: locating a second point of commonality closer to respective stack tops of the plurality of stack traces than is the point of commonality; determining a module of the plurality of software modules, wherein the module comprises the second point of commonality; and determining that the second point of commonality is not the point of commonality based at least in part on the module being listed in a whitelist.

N: The method according to paragraph L or M, further comprising: determining, based at least in part on at least two stack traces of the plurality of stack traces, a plurality of instruction addresses associated with the malware module; and determining a malicious region of the malware module based at least in part on the plurality of IAR values.

O: The one or more computer storage media according to any of paragraphs L-N, the operations further comprising: determining a first set of stack frames for a first stack trace of the plurality of stack traces; determining a second set of stack frames for a second, different stack trace of the plurality of stack traces; locating, as the point of commonality, a first stack frame of the first set of stack frames, wherein: the first stack frame and the stack frames preceding it in the first set of stack frames match corresponding stack frames in the second set of stack frames; and a second stack frame following the first stack frame in the first set of stack frames differs from a corresponding stack frame in the second set of stack frames.

P: The one or more computer storage media according to paragraph O, wherein: the first stack trace is associated with a respective event having a first event type; and the second stack trace is associated with a respective event having the first event type.

Q: The one or more computer storage media according to any of paragraphs L-P, the operations further comprising: before locating the loop, receiving the sequence of events from the monitored computing device via a network; after locating the loop, requesting, via the network, at least one stack trace of the plurality of stack traces; and before locating the point of commonality, receiving, via the network, the at least one stack trace.

R: The one or more computer storage media according to any of paragraphs L-Q, the operations further comprising at least: terminating the malware module, or quarantining the malware module.

S: The one or more computer storage media according to any of paragraphs L-R, wherein the loop is defined at least partly by a boundary, the operations further comprising: selecting a first portion of the sequence of events; selecting a second portion of the sequence of events; determining a first distribution of event types of the events within the first portion; determining a second distribution of event types of the events within the second portion; determining that a difference between the first distribution and the second distribution satisfies a predetermined boundary criterion; and in response, locating the boundary in the sequence of events between the first portion and the second portion.

T: The one or more computer storage media according to paragraph S, the operations further comprising: determining that the difference between the first distribution and the second distribution satisfies a predetermined capture condition; and, in response: determining a first set of stack frames for a first stack trace of the plurality of stack traces; and determining a second set of stack frames for a second, different stack trace of the plurality of stack traces.

U: The one or more computer storage media according to any of paragraphs L-T, the operations further comprising: determining a distribution of event types of the events within the loop; and determining that the loop is associated with malware based at least in part on the distribution of event types within the loop.

V: The one or more computer storage media according to paragraph U, the operations further comprising: determining that the distribution of event types within the loop is not found in a catalog of distributions associated with the loop; and in response, determining that the loop is associated with malware.

W: The one or more computer storage media according to paragraph U or V, the operations further comprising: determining that the distribution of event types within the loop is found in a catalog of distributions associated with malware; and in response, determining that the loop is associated with malware.

X: A method of determining that a sequence of events is associated with malware, the method comprising: receiving event records of respective events in the sequence of events, each event record associated with a monitored computing device and having an event type; locating a loop within the sequence of events based at least in part on relative frequencies of the event types; determining a distribution of event types of the events within the loop; and determining that the sequence of events is associated with malware based at least in part on the distribution of event types within the loop.

Y: The method according to paragraph X, wherein events of the sequence of events are produced by at least one process or at least one thread.

Z: The method according to paragraph X or Y, wherein the loop is defined at least partly by a boundary, the method further comprising: selecting a first portion of the sequence of events; selecting a second portion of the sequence of events; determining a first distribution of event types of the events within the first portion; determining a second distribution of event types of the events within the second portion; determining that a difference between the first distribution and the second distribution satisfies a predetermined boundary criterion; and in response, locating the boundary in the sequence of events between the first portion and the second portion.

AA: The method according to paragraph Z, wherein the distribution of event types comprises information representing the occurrences of events outside both the first portion and the second portion.

AB: The method according to paragraph Z or AA, wherein the first portion and the second portion comprise respective back-to-back fixed-size sliding windows.

AC: The method according to any of paragraphs X-AB, wherein the distribution of event types comprises a histogram of the event types of the events within the loop.

AD: The method according to any of paragraphs X-AC, wherein the respective event types are selected from the group consisting of: a system-call type, an Application Programming Interface (API)-call type, an input-output (I/O) request packet (IRP) type, or an inter-process communication (IPC)-message type.

AE: The method according to any of paragraphs X-AD, further comprising: determining that the distribution of event types within the loop is not found in a catalog of distributions associated with the sequence of events; and in response, determining that the sequence of events is associated with malware.

AF: The method according to any of paragraphs X-AE, further comprising: determining that the distribution of event types within the loop is found in a catalog of distributions associated with malware; and in response, determining that the sequence of events is associated with malware.

AG: The method according to any of paragraphs X-AF, further comprising detecting, at the monitored computing device, a plurality of stack traces associated with respective events of the events within the loop.

AH: The method according to any of paragraphs X-AG, further comprising, in response to determining that the sequence of events is associated with malware, terminating at least one software module associated with the sequence of events.

AI: A computer-readable medium, e.g., a computer storage medium, having thereon computer-executable instructions, the computer-executable instructions upon execution configuring a computer to perform operations as any of paragraphs A-K, L-W, or X-AH recites.

AJ: A device comprising: a processor; and a computer-readable medium, e.g., a computer storage medium, having thereon computer-executable instructions, the computer-executable instructions upon execution by the processor configuring the device to perform operations as any of paragraphs A-K, L-W, or X-AH recites.

AK: A system comprising: means for processing; and means for storing having thereon computer-executable instructions, the computer-executable instructions including means to configure the system to carry out a method as any of paragraphs A-K, L-W, or X-AH recites.

CONCLUSION

Various techniques described herein can permit processing sequences of events to locate loops in those sequences, determining which modules include or control those loops, determining whether sequences of events, or execution sets, are associated with malware, or determining which modules of a plurality of software modules are malicious. Various examples permit locating malware that attempts to disguise itself behind or within other programs. Some examples permit terminating, quarantining, or otherwise remediating malware or mitigating its effects. Some examples permit detecting malware without requiring collection of large amounts of data about each event, and therefore permit detecting malware with reduced data-storage and data-transfer burdens compared to some prior schemes.

Some examples are described with reference to malware detection, but techniques described herein are not limited to security-relevant event streams. For example, techniques used herein can be used to handle events associated with system performance, troubleshooting, data distribution, or other technologies.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed invention. For example, computing devices 102 or 104, network 110, processing unit 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer operating system 220. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing device(s) 102, 104, 106, or 200, such as one or more internal or external CPUs or GPUs, or one or more pieces of hardware logic such as FPGAs, DSPs, or other types of accelerators.

What is claimed is:

1. A method of determining that a sequence of events at a monitored computing device is associated with malware, the method comprising:

detecting, at the monitored computing device, the sequence of the events, individual events having respective event types and taking place at the monitored computing device;

locating a loop within the sequence of events based at least in part on relative frequencies of the event types, wherein the loop is defined at least partly by a boundary;

determining a distribution of event types of the events within the loop;

determining that the sequence of events is associated with malware based at least in part on the distribution of event types within the loop;

selecting a first portion of the sequence of events;

selecting a second portion of the sequence of events, wherein the first portion and the second portion comprise respective back-to-back fixed-size sliding windows;

determining a first distribution of event types of the events within the first portion;

determining a second distribution of event types of the events within the second portion;

determining that a difference between the first distribution of the first portion and the second distribution of the second portion satisfies a predetermined boundary criterion representing a condition for locating a boundary between distributions of back-to-back fixed-size sliding windows, wherein a previous first portion of the back-to-back fixed-size sliding windows corresponding to a previous difference of distributions at least partially overlaps with the first portion;

in response to determining that the difference satisfies the predetermined boundary criterion, locating the boundary at least partly defining the loop in the sequence of events between the first portion and the second portion; and in response to determining that the sequence of events is associated with malware, performing a remediation operation or a mitigation operation on at least one software module associated with the sequence of events.

2. The method according to claim 1, wherein events of the sequence of events are produced by at least one process or at least one thread.

3. The method according to claim 1, wherein the distribution of event types comprises a histogram of the event types of the events within the loop.

4. The method according to claim 1, wherein the respective event types are selected from the group consisting of: a system-call type, an Application Programming Interface (API)-call type, an input-output (I/O) request packet (IRP) type, or an inter-process communication (IPC)-message type.

5. The method according to claim 1, further comprising:
determining that the distribution of event types within the loop is not found in a catalog of distributions associated with the sequence of events; and
in response, determining that the sequence of events is associated with malware.

6. The method according to claim 1, further comprising:
determining that the distribution of event types within the loop is found in a catalog of distributions associated with malware; and
in response, determining that the sequence of events is associated with malware.

7. The method according to claim 1, further comprising detecting, at the monitored computing device, a plurality of stack traces associated with respective events of the events within the loop.

8. The method according to claim 7, further comprising locating a point of commonality among the plurality of stack traces associated with respective events of the events within the loop.

9. The method according to claim 1, further comprising, in response to determining that the sequence of events is associated with malware, terminating the at least one software module associated with the sequence of events.

10. A method of determining that a sequence of events is associated with malware, the method comprising:
receiving event records of respective events in the sequence of events, each event record associated with a monitored computing device and having an event type;

locating a loop within the sequence of events based at least in part on relative frequencies of the event types, wherein the loop is defined at least partly by a boundary;

determining a distribution of event types of the events within the loop;

determining that the sequence of events is associated with malware based at least in part on the distribution of event types within the loop;

selecting a first portion of the sequence of events;
selecting a second portion of the sequence of events;
determining a first distribution of event types of the events within the first portion;

determining a second distribution of event types of the events within the second portion;

determining that a difference between the first distribution of the first portion and the second distribution of the second portion satisfies a predetermined boundary criterion representing a condition for locating a boundary between the distributions of portions of the sequence of events, wherein the first portion at least partially overlaps with a previous first portion corresponding to a previous difference between a previous first distribution of the previous first portion and a previous second distribution of a previous second portion;

in response to determining that the difference satisfies the predetermined boundary criterion, locating the boundary at least partly defining the loop in the sequence of events between the first portion and the second portion, the distribution of event types comprising information representing the occurrences of events outside both the first portion and the second portion; and in response to determining that the sequence of events is associated with malware, performing a remediation operation or a mitigation operation associated with the sequence of events.

11. The method according to claim 10, further comprising:
detecting, at the monitored computing device, a plurality of stack traces associated with respective events of the events within the loop; and locating a point of commonality among the plurality of stack traces.

12. One or more computer storage media having thereon computer-executable instructions that, upon execution by a processing unit, cause the processing unit to perform operations for determining that a sequence of events at a monitored computing device is associated with malware, the operations comprising:

detecting, at the monitored computing device, the sequence of the events, individual events having respective event types and taking place at the monitored computing device;

locating a loop within the sequence of events based at least in part on relative frequencies of the event types, wherein the loop is defined at least partly by a boundary;

determining a distribution of event types of the events within the loop;

determining that the sequence of events is associated with malware based at least in part on the distribution of event types within the loop;

selecting a first portion of the sequence of events;

selecting a second portion of the sequence of events, wherein the first portion and the second portion comprise respective back-to-back fixed-size sliding windows;

determining a first distribution of event types of the events within the first portion;

determining a second distribution of event types of the events within the second portion;

determining that a difference between the first distribution of the first portion and the second distribution of the second portion satisfies a predetermined boundary criterion representing a condition for locating a boundary between distributions of back-to-back fixed-size sliding windows, wherein a previous first portion of the back-to-back fixed-size sliding windows corresponding to a previous difference of distributions at least partially overlaps with the first portion;

in response to determining that the difference satisfies the predetermined boundary criterion, locating the boundary at least partly defining the loop in the sequence of events between the first portion and the second portion; and in response to determining that the sequence of events is associated with malware, performing a remediation operation or a mitigation operation on at least one software module associated with the sequence of events.

13. The one or more computer storage media according to claim 12, wherein events of the sequence of events are produced by at least one process or at least one thread.

14. The one or more computer storage media according to claim 12, wherein the distribution of event types comprises a histogram of the event types of the events within the loop.

15. The one or more computer storage media according to claim 12, wherein the respective event types are selected from the group consisting of: a system-call type, an Application Programming Interface (API)-call type, an input-output (I/O) request packet (IRP) type, or an inter-process communication (IPC)-message type.

16. The one or more computer storage media according to claim 12, the operations further comprising:
   determining that the distribution of event types within the loop is not found in a catalog of distributions associated with the sequence of events; and
   in response, determining that the sequence of events is associated with malware.

17. The one or more computer storage media according to claim 12, the operations further comprising:
   determining that the distribution of event types within the loop is found in a catalog of distributions associated with malware; and
   in response, determining that the sequence of events is associated with malware.

18. The one or more computer storage media according to claim 12, the operations further comprising detecting, at the monitored computing device, a plurality of stack traces associated with respective events of the events within the loop.

19. The one or more computer storage media according to claim 18, the operations further comprising locating a point of commonality among the plurality of stack traces associated with respective events of the events within the loop.

20. The one or more computer storage media according to claim 12, the operations further comprising, in response to determining that the sequence of events is associated with malware, terminating the at least one software module associated with the sequence of events.

* * * * *